United States Patent
Annaka et al.

(10) Patent No.: US 12,389,120 B2
(45) Date of Patent: *Aug. 12, 2025

(54) COMMUNICATION TERMINAL, IMAGE COMMUNICATION SYSTEM, AND METHOD OF DISPLAYING IMAGE

(71) Applicant: Ricoh Company, Ltd., Tokyo (JP)

(72) Inventors: Hidekuni Annaka, Saitama (JP); Kenichiro Morita, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,313

(22) Filed: Nov. 21, 2023

(65) Prior Publication Data

US 2024/0089603 A1    Mar. 14, 2024

Related U.S. Application Data

(63) Continuation of application No. 17/831,462, filed on Jun. 3, 2022, now Pat. No. 11,863,871.

(30) Foreign Application Priority Data

Jun. 4, 2021 (JP) .................................. 2021-094184

(51) Int. Cl.
*H04N 23/698* (2023.01)
*H04N 23/661* (2023.01)

(52) U.S. Cl.
CPC ......... *H04N 23/698* (2023.01); *H04N 23/661* (2023.01)

(58) Field of Classification Search
CPC ........................... H04N 23/698; H04N 23/661
See application file for complete search history.

(56) References Cited

U.S. PATENT DOCUMENTS

2006/0070105 A1    3/2006  Kawai
2014/0152852 A1*   6/2014  Ito .................. H04N 1/2166
                                              348/207.1

(Continued)

FOREIGN PATENT DOCUMENTS

JP        2016-025640        2/2016

(Continued)

OTHER PUBLICATIONS

Extended European Search Report issued Oct. 31, 2022 in European Patent Application No. 22176038.2, 12 pages.

(Continued)

*Primary Examiner* — Thai Q Tran
*Assistant Examiner* — Jose M Mesa
(74) *Attorney, Agent, or Firm* — XSENSUS LLP

(57) ABSTRACT

A communication terminal including circuitry to: receive video data including a captured image, from a communication management server that manages the captured image of video data distributed from another communication terminal different from the communication terminal; determine whether any predetermined-area information indicating a predetermined area of the captured image to be displayed during a reproduction time of the video data is stored in a memory; and control a display to display an image representing the predetermined area indicated by the predetermined-area information, based on a determination that the predetermined-area information is stored in the memory.

15 Claims, 28 Drawing Sheets

(56) References Cited

U.S. PATENT DOCUMENTS

| | | | |
|---|---|---|---|
| 2014/0270692 A1* | 9/2014 | Suzuki | H04N 23/698 386/230 |
| 2017/0018217 A1 | 1/2017 | Ogino et al. | |
| 2019/0098211 A1 | 3/2019 | Ohmura et al. | |
| 2019/0306004 A1 | 10/2019 | Hakata et al. | |
| 2019/0306201 A1 | 10/2019 | Ohmura et al. | |
| 2019/0306421 A1 | 10/2019 | Takeda et al. | |
| 2019/0306458 A1 | 10/2019 | Soneda et al. | |
| 2020/0045230 A1 | 2/2020 | Ohmura et al. | |
| 2020/0045244 A1 | 2/2020 | Ohmura et al. | |
| 2020/0186407 A1 | 6/2020 | Morita et al. | |
| 2020/0244510 A1 | 7/2020 | Hakata et al. | |
| 2020/0274904 A1 | 8/2020 | Ohmura et al. | |
| 2020/0296284 A1 | 9/2020 | Aikawa et al. | |
| 2020/0296302 A1 | 9/2020 | Shiro et al. | |
| 2020/0374463 A1 | 11/2020 | Fujita et al. | |
| 2020/0389640 A1 | 12/2020 | Lee et al. | |
| 2021/0026589 A1 | 1/2021 | Morita et al. | |
| 2021/0090211 A1 | 3/2021 | Takeda et al. | |
| 2021/0099669 A1 | 4/2021 | Shiro et al. | |
| 2022/0070412 A1 | 3/2022 | Aikawa et al. | |
| 2022/0086346 A1 | 3/2022 | Shiro et al. | |
| 2022/0094850 A1 | 3/2022 | Morita et al. | |
| 2022/0103751 A1 | 3/2022 | Annaka et al. | |
| 2022/0103763 A1 | 3/2022 | Annaka et al. | |

OTHER PUBLICATIONS

Hao-Juan Huang, et al., "Director-360: Introducing Camera Handling to 360 Cameras", Proceedings of the 2020 ACM SIGSIM Conference on Principles of Advanced Discrete Simulation, Oct. 5, 2020, 11 pages, XP058729029.

Yaxian Bai, et al., "Signalling of ROI for Viewport-driven Interactivity", International Organisation for Standardisation Organisation Internationale De Normalisation ISO/IEC JTC1/SC29/WG11 Coding of Moving Pictures and Audio, Jan. 11, 2020, 6 pages, XP030224859.

U.S. Appl. No. 17/692,210, filed Mar. 11, 2022, Kenichiro Morita, et al.

U.S. Appl. No. 17/643,474, filed Dec. 9, 2021, Hiroshi Hinohara, et al.

\* cited by examiner

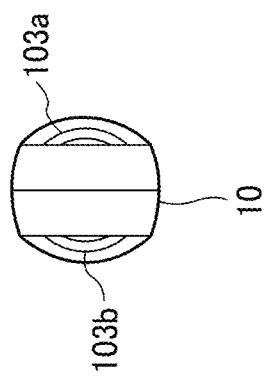
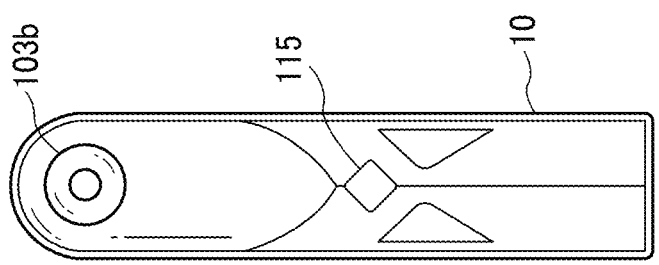
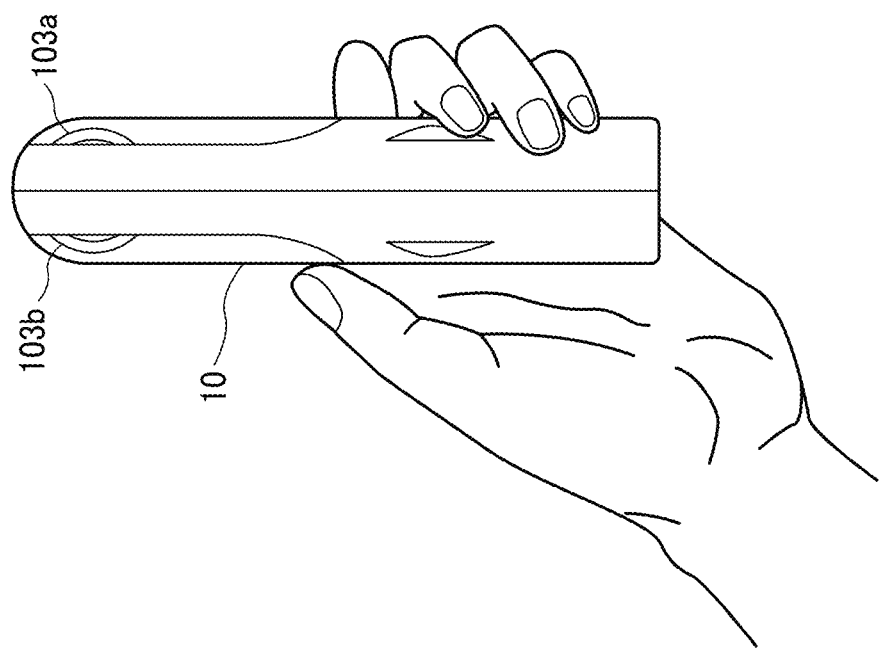

HEMISPHERICAL IMAGE (FRONT)

HEMISPHERICAL IMAGE (BACK)

CAPTURED IMAGE (EQUIRECTANGULAR PROJECTION IMAGE EC)

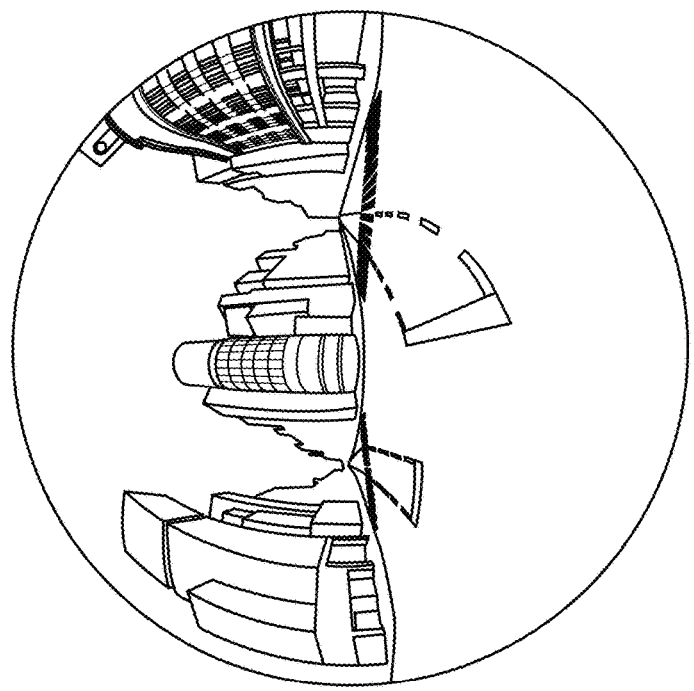
FIG. 4B
SPHERICAL IMAGE CE
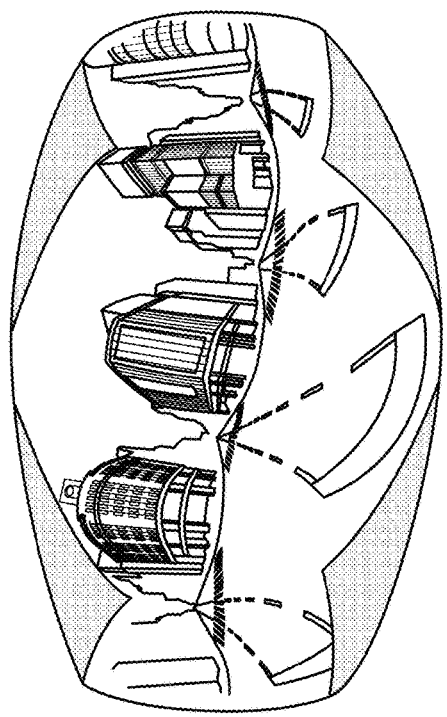
FIG. 4A
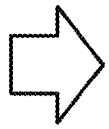
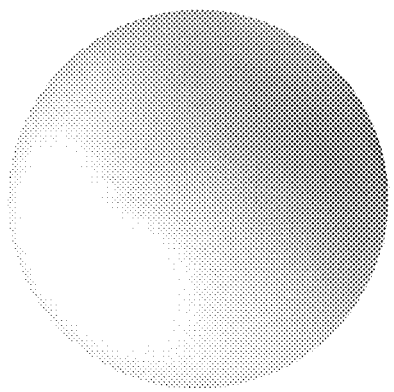
EQUIRECTANGULAR PROJECTION IMAGE EC

FIG. 14

| IMAGE DATA ID | IP ADDRESS OF TRANSMISSION SOURCE TERMINAL | SOURCE NAME (IMAGE TYPE INFORMATION) |
|---|---|---|
| RS001 | 1.2.1.3 | Video_Theta |
| RS002 | 1.2.2.3 | Video_Theta |
| RS003 | 1.3.1.3 | Video |
| RS004 | 1.3.2.3 | Video |
| RS005 | 1.2.2.5 | Video_Theta |
| ... | ... | ... |

FIG. 15

| VENDOR ID AND PRODUCT ID IN GUID OF IMAGE CAPTURING DEVICE |
|---|
| vid_05ca&pid_2711 |
| vid_05ca&pid_3822 |
| ... |

FIG. 16

| TIME STAMP | PREDETERMINED-AREA INFORMATION | | |
|---|---|---|---|
| | RADIUS VECTOR (r) | POLAR ANGLE ($\theta$) | AZIMUTH ANGLE ($\phi$) |
| 10001 | 10 | 20 | 30 |
| 10002 | 20 | 30 | 40 |
| 10003 | – | – | – |
| 10004 | 20 | 20 | 30 |
| ... | ... | ... | ... |

FIG. 17

| SESSION ID | IP ADDRESS OF PARTICIPANT COMMUNICATION TERMINAL |
|---|---|
| se101 | 1.2.1.3, 1.2.2.3, 1.3.1.3, 1.3.2.3, ... |
| se102 | 1.2.1.3, 1.2.2.5, 1.3.1.3, ... |
| ... | ... |

FIG. 18

| SESSION ID | IMAGE DATA ID | IP ADDRESS OF TRANSMISSION SOURCE TERMINAL | SOURCE NAME (IMAGE TYPE INFORMATION) |
|---|---|---|---|
| se101 | RS001 | 1.2.1.3 | Video_Theta |
| se101 | RS002 | 1.2.2.3 | Video_Theta |
| se101 | RS003 | 1.3.1.3 | Video |
| se101 | RS004 | 1.3.2.3 | Video |
| se102 | RS005 | 1.2.2.5 | Video_Theta |
| ... | ... | ... | ... |

FIG. 19

| IP ADDRESS OF IMAGE TRANSMISSION SOURCE | FILE NAME |
|---|---|
| 1.2.1.3 | 1213.mp4 |
| 1.2.1.4 | 1214.mp4 |
| 1.2.1.5 | 1215.mp4 |
| 1.2.1.6 | 1216.mp4 |
| 1.2.2.7 | 1227.mp4 |
| ... | ... |

FIG. 20

FILE NAME: 1213.mp4

| IP ADDRESS OF IMAGE TRANSMISSION SOURCE | IP ADDRESS OF IMAGE TRANSMISSION DESTINATION | TIME STAMP | PREDETERMINED-AREA INFORMATION | | | |
|---|---|---|---|---|---|---|
| | | | RADIUS VECTOR (r) | POLAR ANGLE (θ) | AZIMUTH ANGLE (φ) | |
| 1.2.1.3 | 1.3.1.3 | 10001 | 10 | 20 | 30 | |
| 1.2.1.3 | all | 10002 | 20 | 30 | 40 | |
| 1.2.1.3 | all | 10003 | – | – | – | |
| 1.2.1.3 | 1.3.1.3 | 10004 | 20 | 20 | 30 | |
| 1.2.1.3 | 1.3.2.3 | 10004 | 20 | 30 | 60 | |
| 1.2.1.3 | 1.2.2.4 | 10010 | – | – | – | |
| ... | ... | ... | ... | ... | ... | |

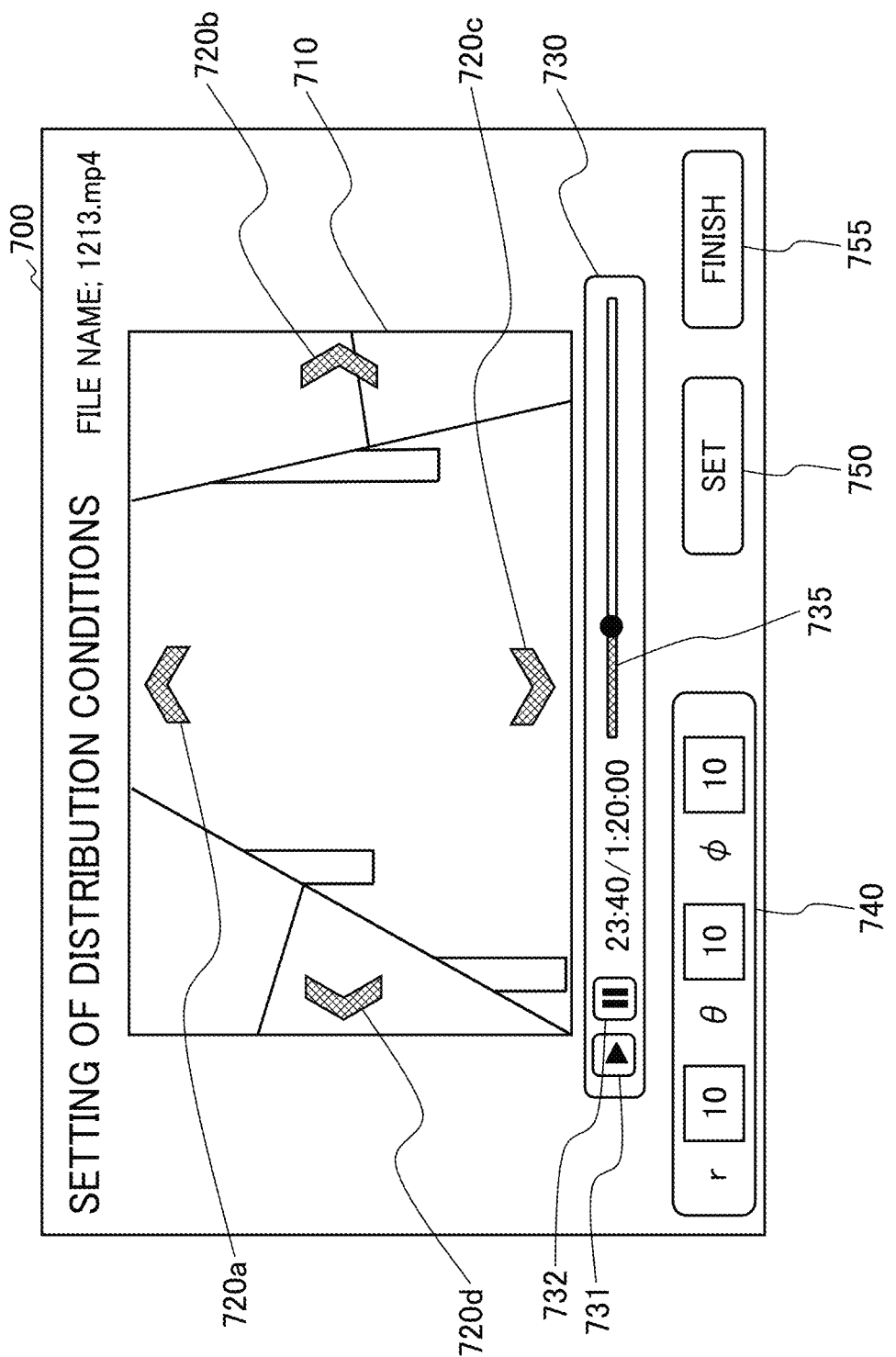

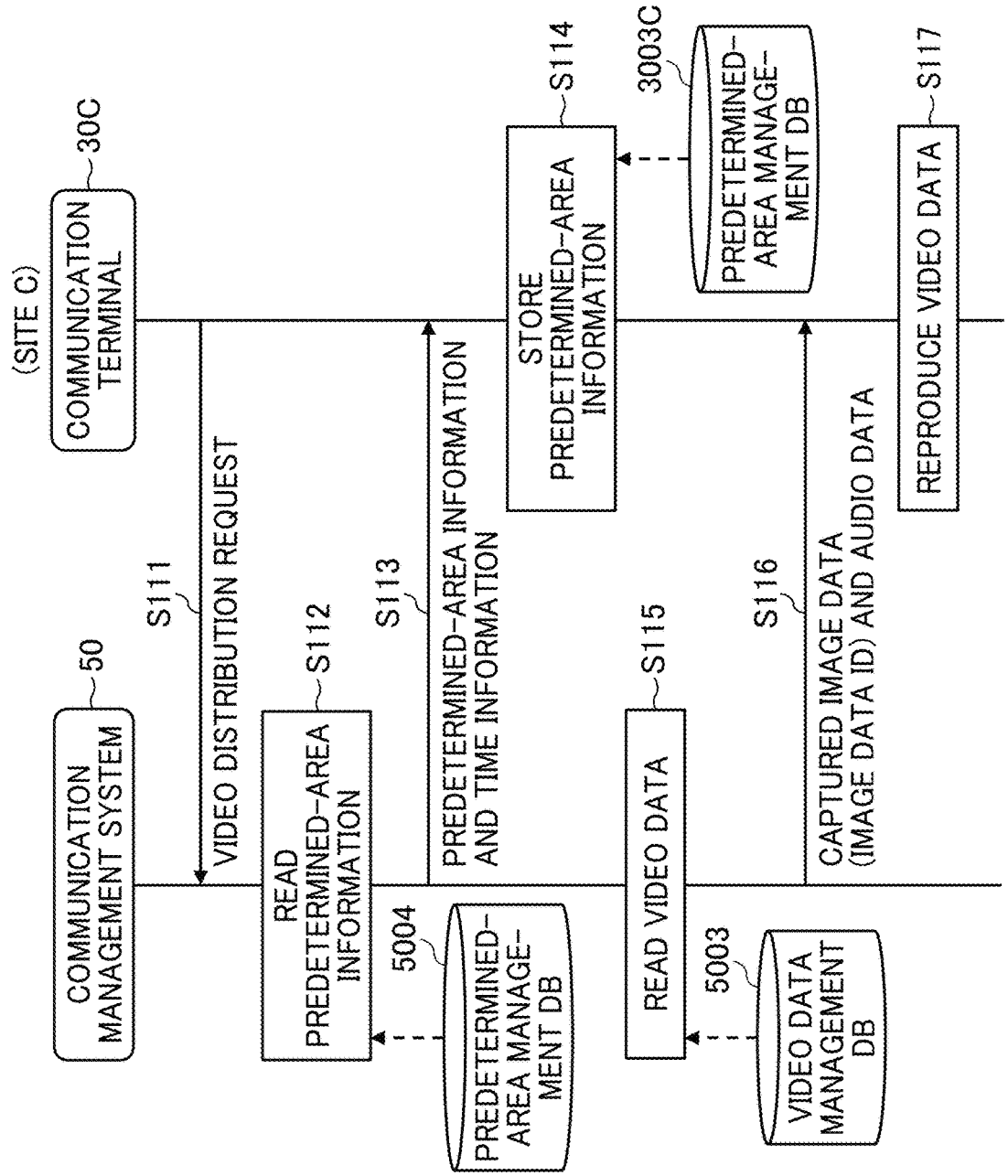

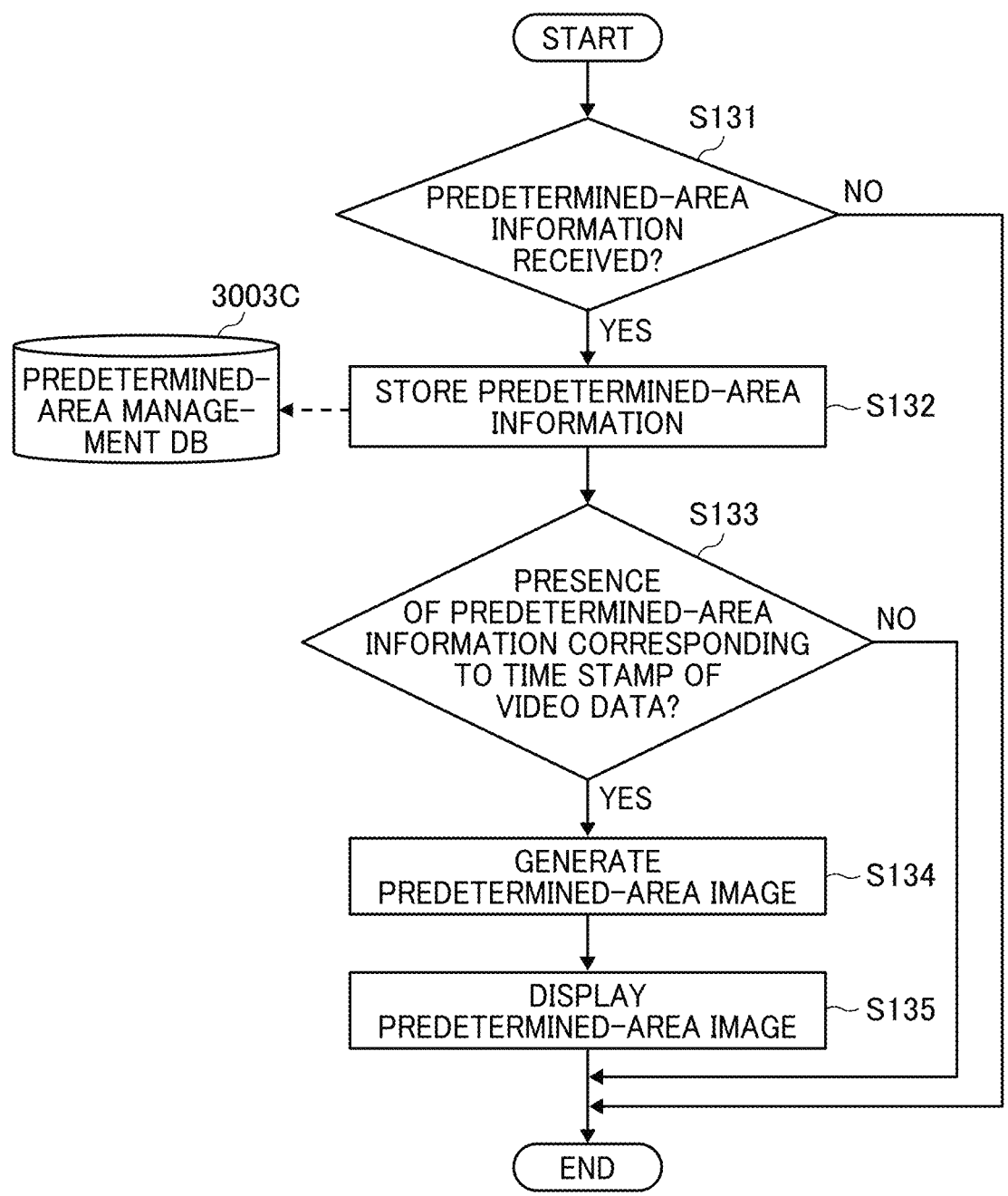

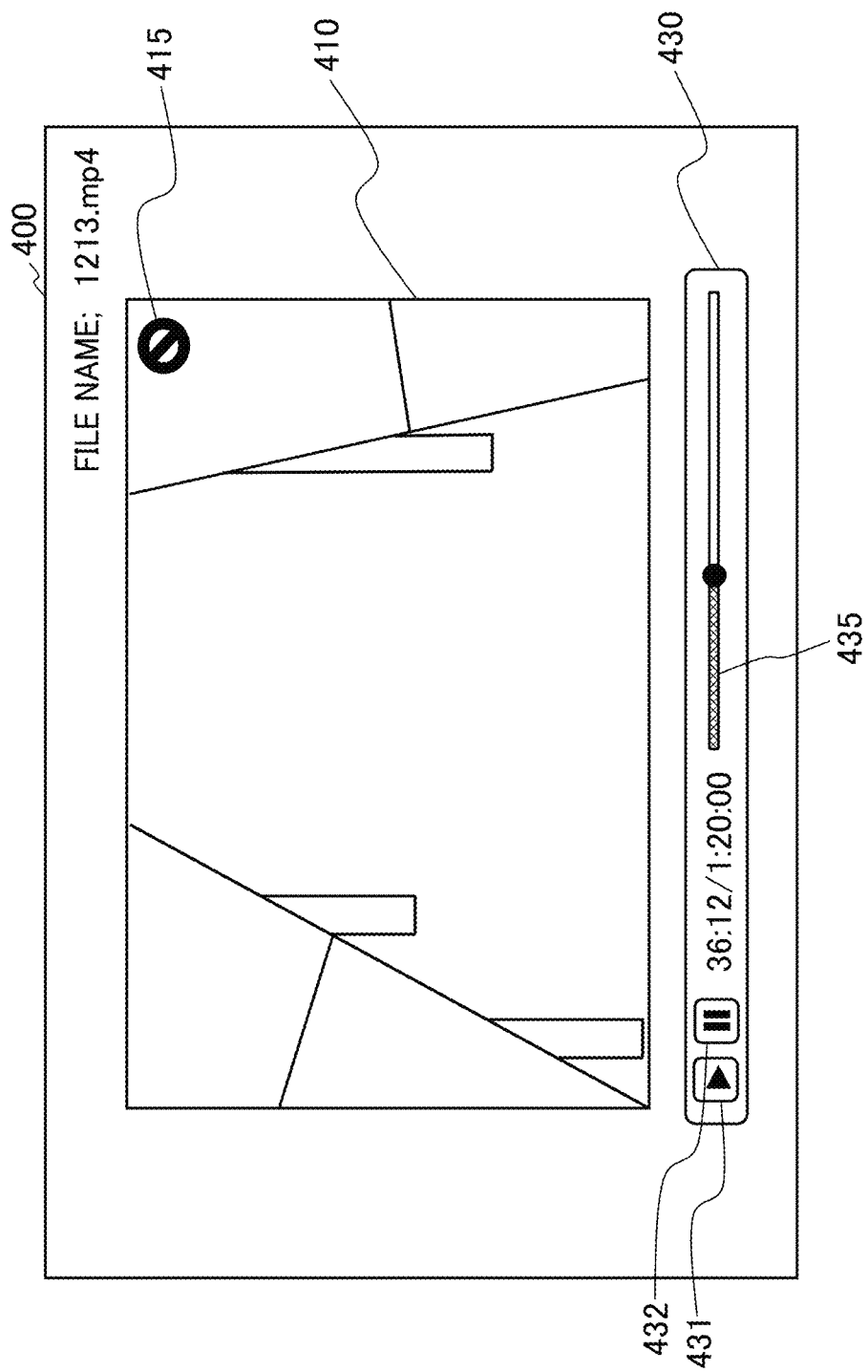

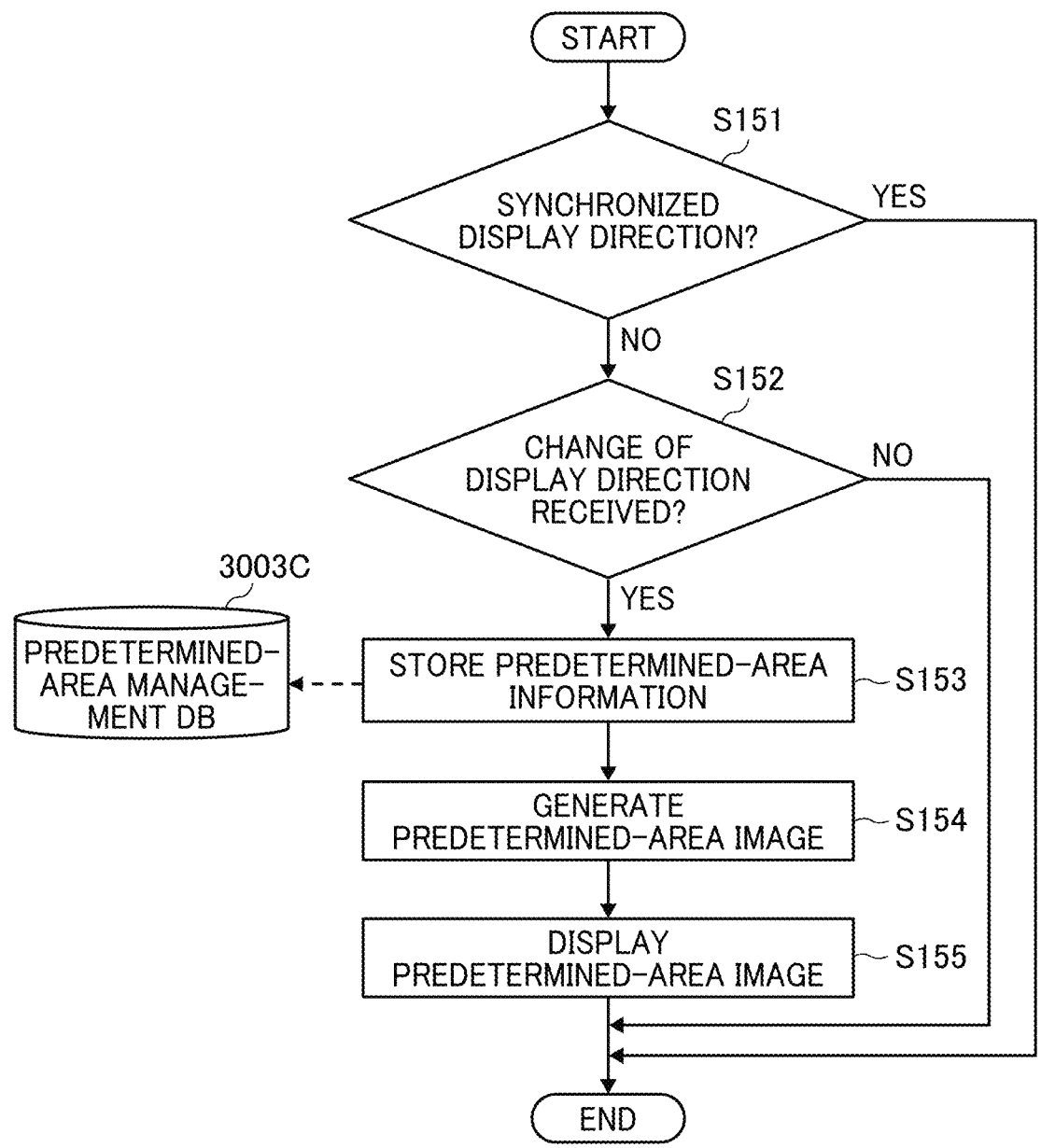

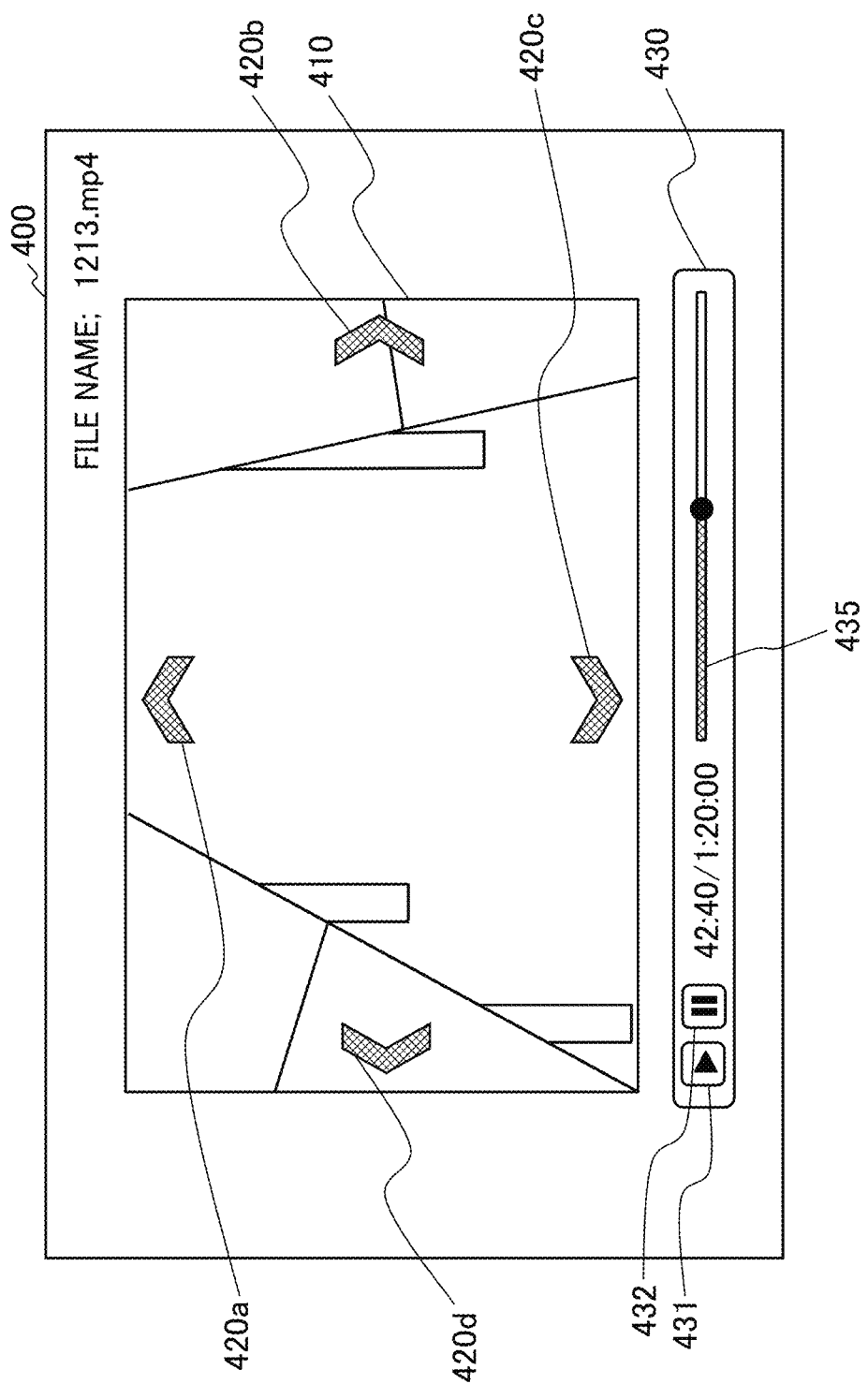

COMMUNICATION TERMINAL, IMAGE COMMUNICATION SYSTEM, AND METHOD OF DISPLAYING IMAGE

CROSS-REFERENCE TO RELATED APPLICATIONS

This application is a continuation of U.S. application Ser. No. 17/831,462, filed Jun. 3, 2022, which is based on and claims priority pursuant to 35 U.S.C. § 119(a) to Japanese Patent Application No. 2021-094184, filed on Jun. 4, 2021, in the Japan Patent Office, the entire disclosure of each is hereby incorporated by reference herein.

BACKGROUND

Technical Field

The present disclosure relates to a communication terminal, an image communication system, and a method of displaying image.

Description of the Related Art

Some image capturing devices are capable of capturing images in all directions using a plurality of wide-angle lenses or fisheye lenses. Image data captured using such an image capturing device at a certain site may be used in a system, which distributes the captured image data in real time to another site, to allow a user at the other site to view an image being captured at the certain site where the image capturing device is installed.

Further, an image capturing device capable of capturing a spherical panoramic image in real time is connectable to communication terminals, and a spherical panoramic image acquired by the image capturing device is transmitted to communication terminals connected to the image capturing device. Each communication terminal sequentially converts the received spherical panoramic image to a predetermined-area image representing a predetermined area, which is a part of the spherical panoramic image, and displays the predetermined-area image on a display. This enables a user at each of remote sites to determine, by himself or herself, a predetermined-area image to be displayed, representing an image of a predetermined area that the user is interested in, from a whole image of the spherical panoramic image.

In the distribution of a spherical panoramic image, viewers are allowed to change their display directions as desired. This enables the viewers to view the spherical panoramic image from different display directions.

In the existing method, however, in the distribution of video data, it is difficult to display an appropriate predetermined area on a communication terminal according to the demand of a distributor or a viewer.

SUMMARY

Example embodiments include a communication terminal including circuitry that: receives video data including a captured image, from a communication management server that manages the captured image of video data distributed from another communication terminal different from the communication terminal; determines whether any predetermined-area information indicating a predetermined area of the captured image to be displayed during a reproduction time of the video data is stored in a memory; and controls a display to display an image representing the predetermined area indicated by the predetermined-area information, based on a determination that the predetermined-area information is stored in the memory.

Example embodiments include an image communication system including a communication terminal including terminal circuitry, and a communication management server including server circuitry. The server circuitry receives data of a captured image transmitted from another communication terminal different from the communication terminal, and stores video data including the captured image, and predetermined-area information indicating a predetermined area of the captured image to be displayed during a reproduction time of the video data. The terminal circuitry receives the video data including the captured image, from the communication management server, determines whether any predetermined-area information indicating a predetermined area of the captured image to be displayed during a reproduction time of the video data is present, and controls a display to display an image representing the predetermined area indicated by the predetermined-area information, based on a determination that the predetermined-area information is present.

Example embodiments include a method of displaying an image, performed by a communication terminal, the method including: receiving video data including a captured image, from a communication management server being configured to manage the captured image of video data distributed from another communication terminal different from the communication terminal; determining whether any predetermined-area information indicating a predetermined area of the captured image to be displayed during a reproduction time of the video data is stored in a memory; and displaying on a display an image representing the predetermined area indicated by the predetermined-area information, based on a determination that the predetermined-area information is stored in the memory.

Example embodiments include a non-transitory recording medium storing a plurality of instructions which, when executed by one or more processors, cause the processors to perform the above-described method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 1A is a left side view of an image capturing device according to embodiments;

FIG. 1B is a front view of the image capturing device according to embodiments;

FIG. 1C is a plan view of the image capturing device according to embodiments;

FIG. 4A is a conceptual diagram illustrating an example of how the image in equirectangular projection is mapped to a surface of a sphere, according to embodiments;

FIG. 4B is a view illustrating a spherical image, according to embodiments;

FIG. 14 is a conceptual view illustrating an example of an image type management table according to embodiments;

FIG. 15 is a conceptual view illustrating an example of an image capturing device management table according to embodiments;

FIG. 16 is a conceptual view illustrating an example of a predetermined-area management table according to embodiments;

FIG. 17 is a conceptual view illustrating an example of a session management table according to embodiments;

FIG. 18 is a conceptual view illustrating an example of an image type management table according to embodiments;

FIG. 19 is a conceptual view illustrating an example of a video data management table according to embodiments;

FIG. 20 is a conceptual view illustrating an example of a predetermined-area management table according to embodiments;

FIG. 28 is a view illustrating an example of a distribution condition setting screen according to embodiments;

FIG. 29 is a sequence diagram illustrating an example of a recorded video data distribution process according to embodiments;

FIG. 30 is a flowchart illustrating an example process for reproducing video data on the communication terminal according to embodiments;

FIG. 31 is a view illustrating an example of a display screen displayed on the communication terminal when a synchronized display direction is provided, according to embodiments;

FIG. 32 is a flowchart illustrating an example process for changing a display direction on the communication terminal according to embodiments; and FIG. 33 is a view illustrating an example of a display screen displayed on the communication terminal when no synchronized display direction is provided, according to embodiments.

Figure 2:
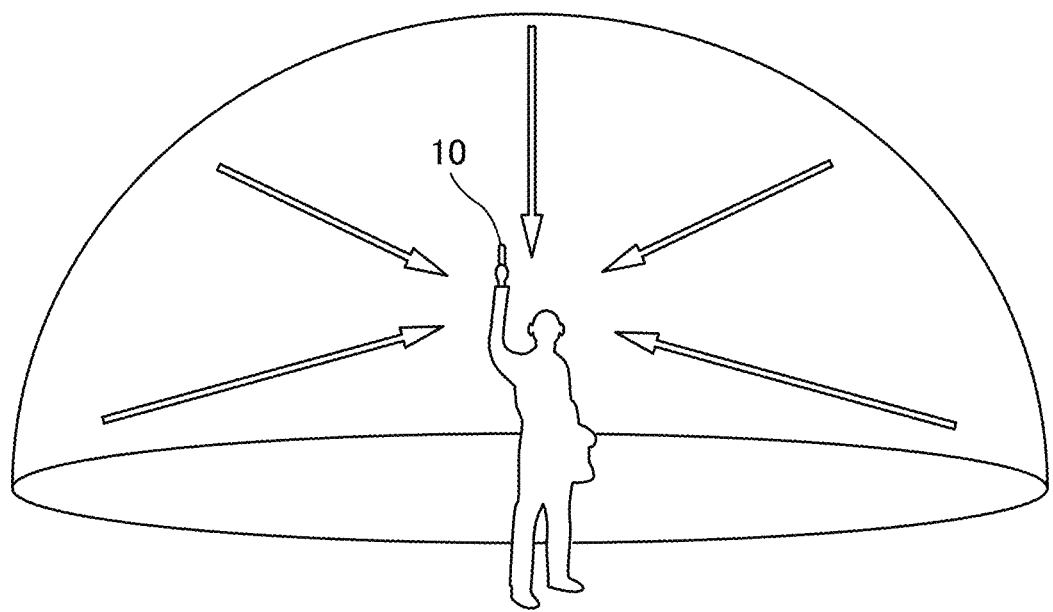
FIG. 2 is an illustration for explaining how a user uses the image capturing device, according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the description of the drawings, the same elements are denoted by the same reference numerals, and redundant descriptions thereof are omitted.

Method for Generating Spherical Image

A method for generating a spherical image according to one or more embodiments is described with reference to FIGS. 1A to 8.

First, referring to FIGS. 1A to 1C, an external view of an image capturing device 10 is described according to the embodiments. The image capturing device 10 is a digital camera for capturing images from which a 360-degree spherical image is generated. FIG. 1A is a left side view of the image capturing device 10. FIG. 1B is a front view of the image capturing device 10. FIG. 1C is a plan view of the image capturing device 10.

As illustrated in FIG. 1A, the image capturing device 10 has a shape such that a person can hold it with one hand. Further, as illustrated in FIGS. 1A, 1B, and 1C, the image capturing device 10 includes an imaging element 103a and an imaging element 103b on its upper section. The imaging element 103a and the imaging element 103b are provided on a front side (anterior side) and a back side (rear side or posterior side) of the image capturing device 10, respectively. These imaging elements (image sensors) 103a and 103b are used in combination with optical members (e.g., lenses 102a and 102b, described below), each being configured to capture a hemispherical image having an angle of view of 180 degrees or wider. As illustrated in FIG. 1B, the image capturing device 10 further includes an operation unit 115 such as a shutter button on the rear side of the image capturing device 10, which is opposite to the front side of the image capturing device 10.

Next, referring to FIG. 2, a description is given of a situation where the image capturing device 10 is used. FIG. 2 is an illustration for explaining how a user uses the image capturing device, according to embodiments. As illustrated in FIG. 2, for example, the image capturing device 10 is used for capturing objects surrounding the user who is holding the image capturing device 10 in his or her hand. The imaging element 103a and the imaging element 103b illustrated in FIGS. 1A to 1C capture the objects surrounding the user to obtain two hemispherical images.

Figure 3A:
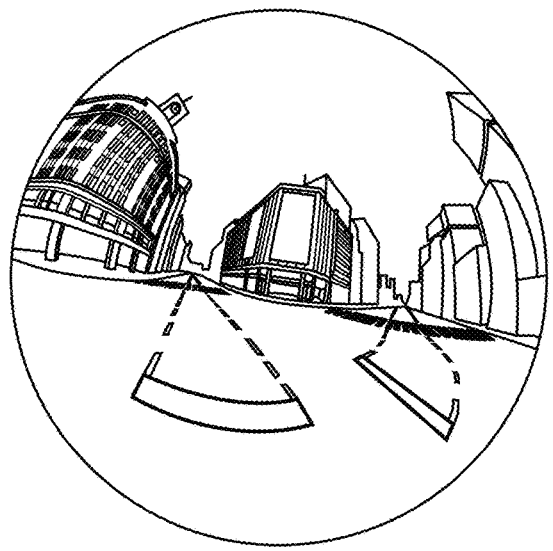
FIG. 3A is a view illustrating a hemispherical image (front side) captured by the image capturing device, according to embodiments.
Figure 3B:
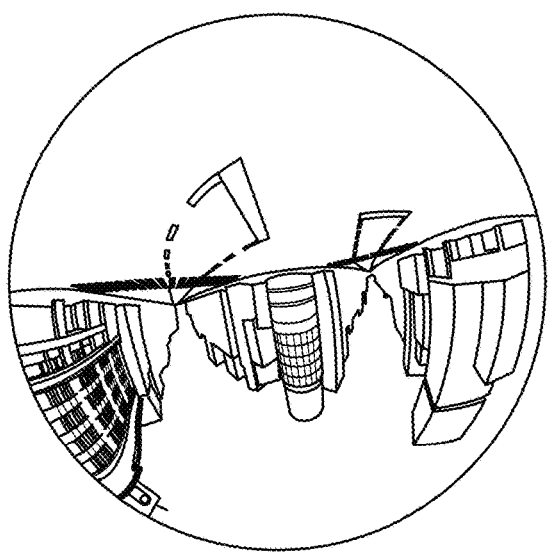
FIG. 3B is a view illustrating a hemispherical image (back side) captured by the image capturing device, according to embodiments.
Figure 3C:
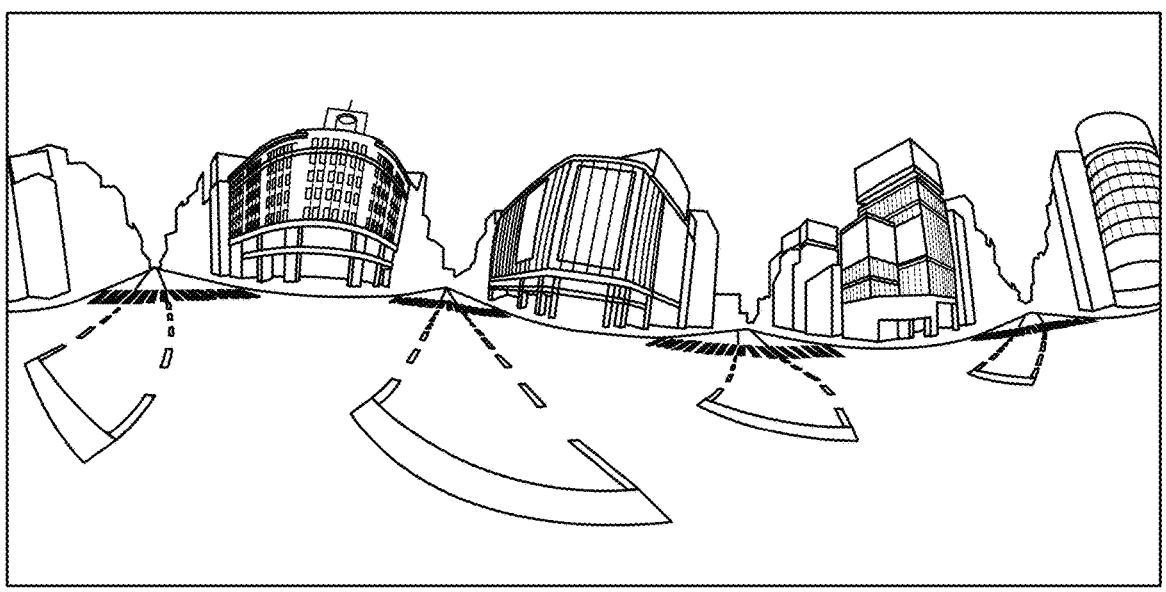
FIG. 3C is a view illustrating an image in equirectangular projection, according to embodiments.

Next, referring to FIGS. 3A to 3C and FIGS. 4A and 4B, a description is given of an overview of an operation of generating an equirectangular projection image EC and a spherical image CE from the images captured by the image capturing device 10. FIG. 3A is a view illustrating a hemispherical image (front side) captured by the image capturing device 10. FIG. 3B is a view illustrating a hemispherical image (back side) captured by the image capturing device 10. FIG. 3C is a view illustrating an image in equirectangular projection, which is referred to as an "equirectangular projection image" (or equidistant cylindrical projection image) EC. FIG. 4A is a conceptual diagram illustrating an example of how the equirectangular projection image EC is mapped to a surface of a sphere CS. FIG. 4B is a view illustrating the spherical image CE.

As illustrated in FIG. 3A, an image captured by the imaging element 103a is a curved hemispherical image (front side) taken through the lens 102a. Further, as illustrated in FIG. 3B, an image captured by the imaging element 103b is a curved hemispherical image (back side) taken through the lens 102b. The image capturing device 10 combines the hemispherical image (front side) and the hemispherical image (back side), which are reversed by 180 degrees from each other, to generate the equirectangular projection image EC as illustrated in FIG. 3C.

The image capturing device 10 uses Open Graphics Library for Embedded Systems (OpenGL ES) to map the equirectangular projection image EC so as to cover the sphere surface as illustrated in FIG. 4A, to generate the spherical image CE as illustrated in FIG. 4B. That is, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a moving image.

Since the spherical image CE is an image attached to the sphere surface to cover the sphere surface, as illustrated in FIG. 4B, a part of the image may look distorted when viewed from the user, providing a feeling of strangeness. To resolve this strange feeling, the image capturing device 10 displays an image of a predetermined area T, which is a part of the spherical image CE, as a flat image having fewer curves. The predetermined area is, for example, a part of the spherical image CE that is viewable by the user. In this disclosure, the image of the predetermined area, which is viewable, may be referred to as a "predetermined-area image" or "viewable-area image" Q. That is, the term "predetermined-area image" and "viewable-area image" may be used interchangeably. Hereinafter, a description is given of displaying the predetermined-area image Q with reference to FIGS. 5 to 8.

Figure 5:
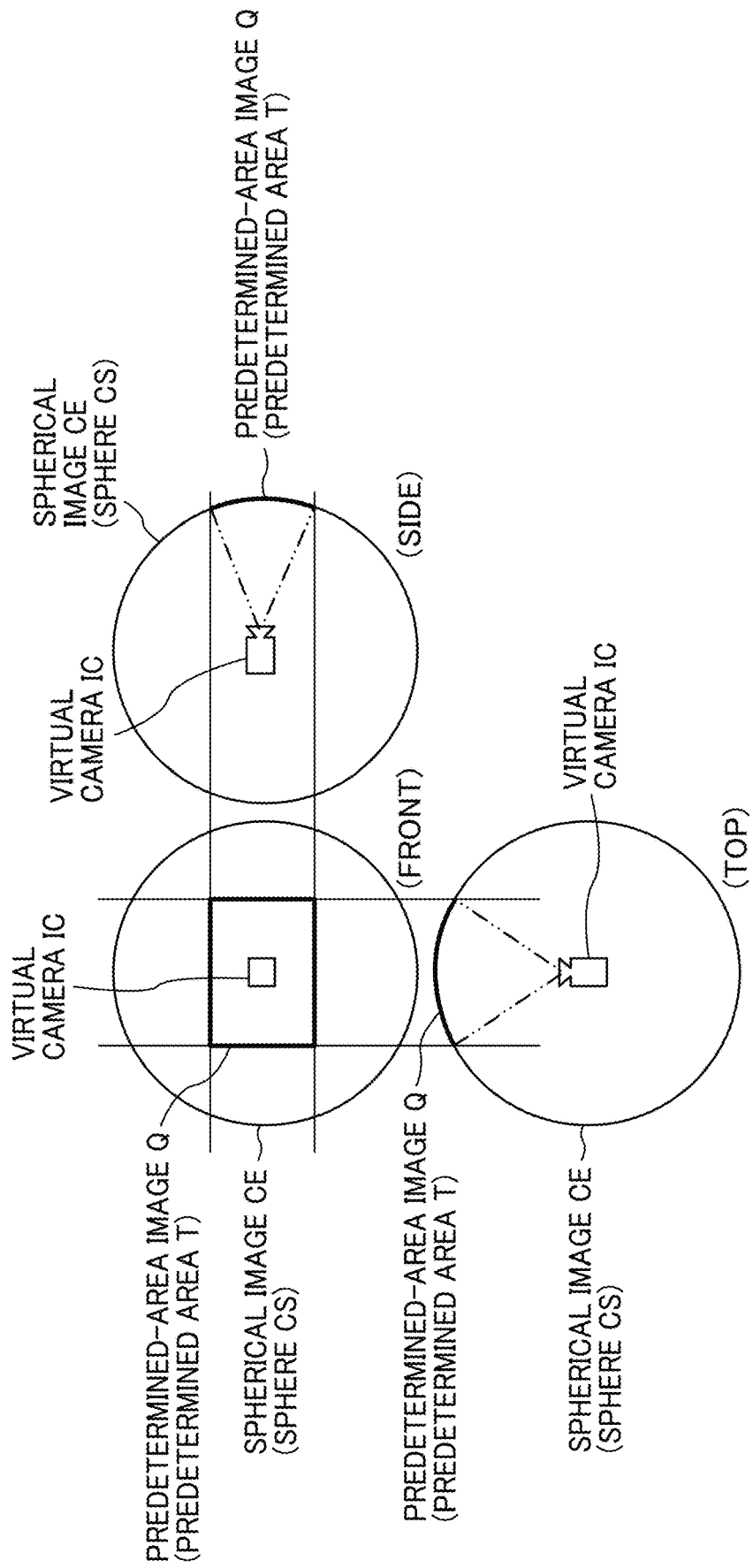
FIG. 5 is a view illustrating positions of a virtual camera and a predetermined area in a case in which the spherical image is represented as a three-dimensional solid sphere according to embodiments.
Figure 6A:
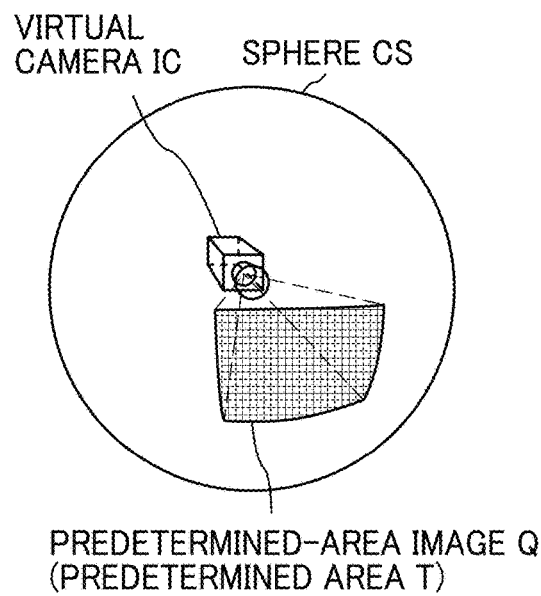
FIG. 6A is a perspective view of the spherical image illustrated in FIG. 5 according to embodiments.
Figure 6B:
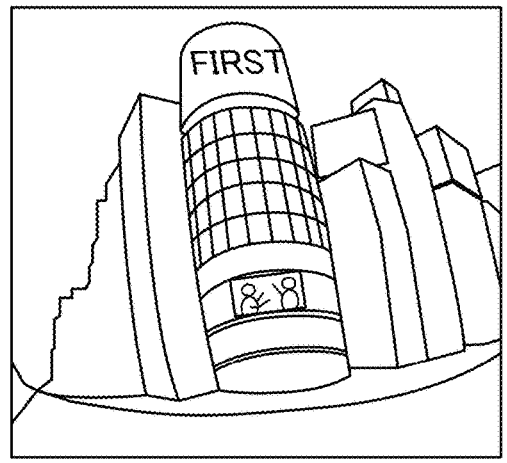
FIG. 6B is a view illustrating an image of the predetermined area on a display, according to embodiments.

FIG. 5 is a view illustrating positions of a virtual camera IC and a predetermined area T in a case in which the spherical image is represented as a three-dimensional solid sphere. The virtual camera IC corresponds to a position of a point of view (viewpoint) of a user who is viewing the spherical image CE represented as a surface area of the three-dimensional solid sphere CS. FIG. 6A is a perspective view of the spherical image CE illustrated in FIG. 5. FIG. 6B is a view illustrating the predetermined-area image Q when displayed on a display. In FIG. 6A, the spherical image CE illustrated in FIG. 5 is represented as a surface area of the three-dimensional (3D) solid sphere CS. Assuming that the spherical image CE having been generated is a surface area of the solid sphere CS, the virtual camera IC is inside the spherical image CE as illustrated in FIG. 5. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE. In addition, zooming in or out the predetermined area T is also determined by bringing the virtual camera IC closer to or away from the spherical image CE. The predetermined-area image Q is an image of the predetermined area T, in the spherical image CE. The predetermined area T is defined by the angle of view α and a distance f from the virtual camera IC to the spherical image CE (see FIG. 7).

The predetermined-area image Q, which is an image of the predetermined area T illustrated in FIG. 6A, is displayed on a display as an image of an imaging area of the virtual camera IC, as illustrated in FIG. 6B. FIG. 6B illustrates the predetermined-area image Q represented by the predetermined-area information that is set by default. The following explains the position of the virtual camera IC, using an imaging direction (ea, aa) and an angle of view a of the virtual camera IC. In another example, the predetermined area T is identified by an imaging area (X, Y, Z) of the virtual camera IC, i.e., the predetermined area T, rather than the angle of view α and the distance f.

Figure 7:
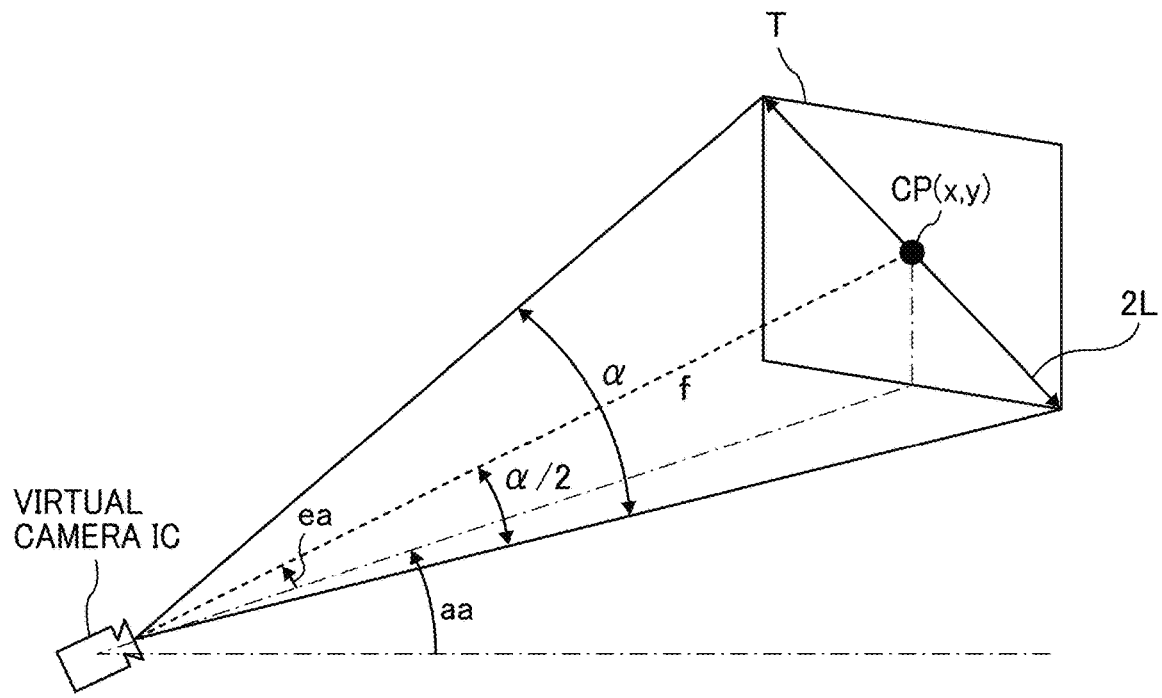
FIG. 7 is a view illustrating a relation between predetermined-area information and the image of the predetermined area according to embodiments.

Referring to FIG. 7, a relation between the predetermined-area information and the image of the predetermined area T is described according to the embodiments. FIG. 7 is a view illustrating a relation between the predetermined-area information and the image of the predetermined area T. As illustrated in FIG. 7, "ea" denotes an elevation angle, "aa" denotes an azimuth angle, and "α" denotes an angle of view, respectively, of the virtual camera IC. The position of the virtual camera IC is adjusted, such that the point of gaze of the virtual camera IC, indicated by the imaging direction (ea, aa), matches a center point CP (x, y) of the predetermined area T as the imaging area of the virtual camera IC. As illustrated in FIG. 7, when it is assumed that a diagonal angle of the predetermined area T specified by the angle of view α of the virtual camera IC is α, the center point CP (x, y) provides the parameters (x, y) of the predetermined-area information. The predetermined-area image Q is an image of the predetermined area T in the spherical image CE. The distance from the virtual camera IC to the center point CP (x, y) of the predetermined area T is denoted by "f". "L" is a distance between the center point CP (x, y) and a given vertex of the predetermined area T (2L is a diagonal line). In FIG. 7, a trigonometric function equation generally expressed by the following equation (1) is satisfied.

$$L/f=\tan(\alpha/2) \qquad (1)$$

The image capturing device 10 described above is an example of an image capturing device capable of acquiring a wide-angle view image. In this disclosure, the spherical image is an example of a wide-angle view image. Here, the wide-angle view image is generally an image taken with a wide-angle lens, such as a lens capable of taking a range wider than a range that the human eye can perceive. Further, the wide-angle view image is generally an image taken with a lens having a focal length of 35 mm or less in terms of 35 mm film.

Figure 8:
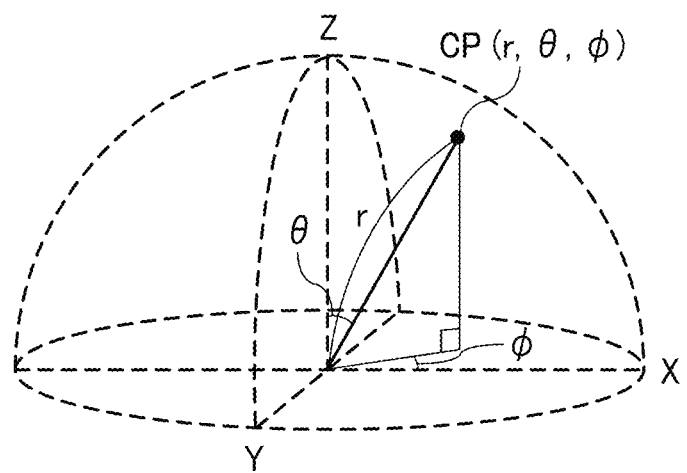
FIG. 8 is a view illustrating points in a three-dimensional Euclidean space defined in spherical coordinates, according to embodiments.

FIG. 8 is a view illustrating points in a three-dimensional Euclidean space defined in spherical coordinates, according to the embodiments. Positional coordinates (r, θ, φ) are given when the center point CP is represented by a spherical polar coordinate system. The positional coordinates (r, θ, φ) represent a radius vector, a polar angle, and an azimuth angle. The radius vector r is a distance from the origin of the three-dimensional virtual space including the spherical image to the center point CP. Accordingly, the radius vector r is equal to "f". FIG. 8 illustrates the relation between these items. In the following description of the embodiments, the positional coordinates (r, θ, φ) of the virtual camera IC are used.

Overview of Image Communication System

Figure 9:
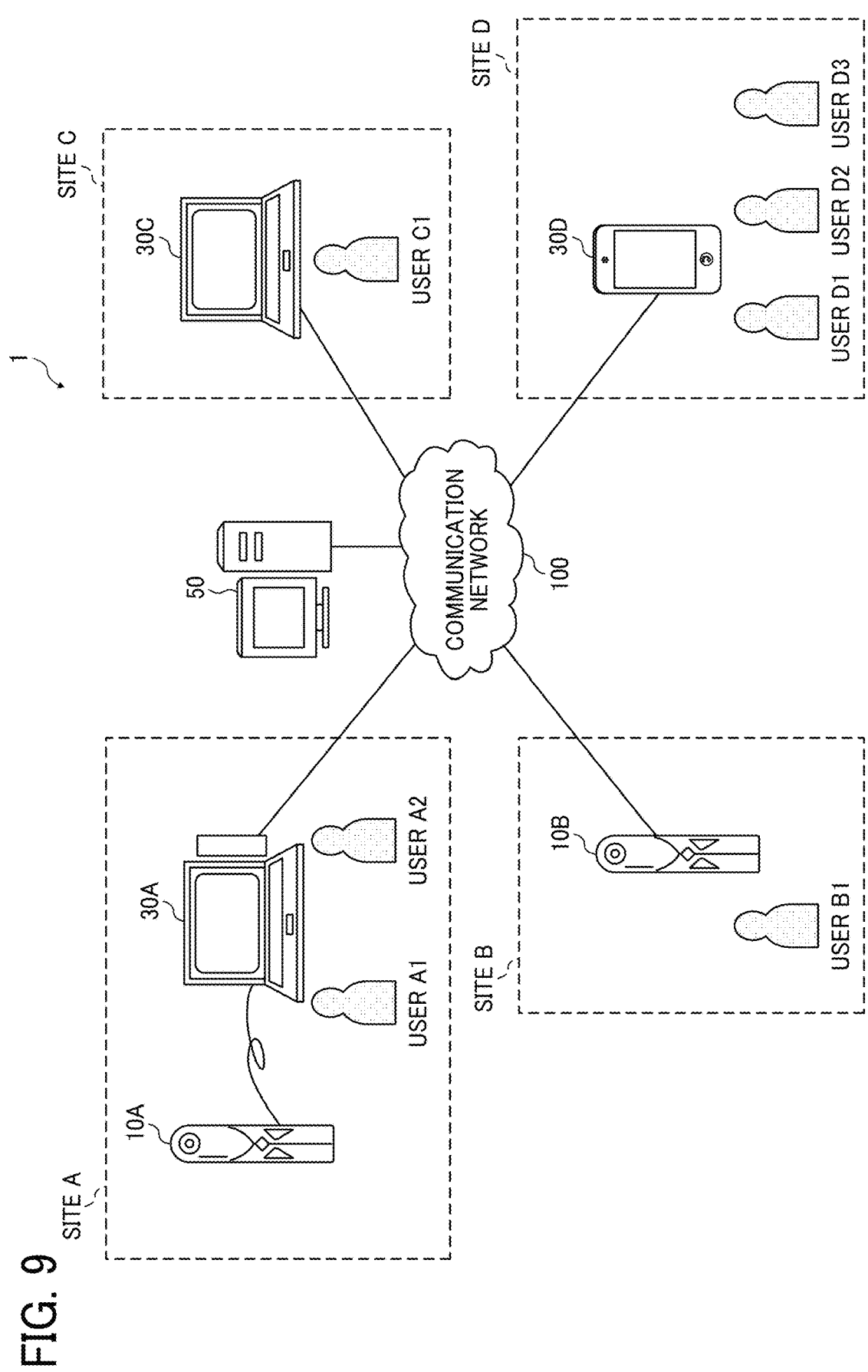
FIG. 9 is a diagram illustrating an example general arrangement of an image communication system according to embodiments.

A description is now given of an overview of a configuration of an image communication system according to an embodiment of the present disclosure, with reference to FIG. 9. FIG. 9 is a diagram illustrating an example general arrangement of an image communication system 1 according to the embodiment. The image communication system 1 illustrated in FIG. 9 is a system for transmitting and receiving captured images such as video images bidirectionally among a plurality of sites. In the image communication system 1, a captured image such as a video image distributed from a certain site is displayed at another site, and a wide-range image (e.g., a spherical image) in which the other site appears is viewable. In the image communication system 1, for example, a captured image of an office floor or the like, which is a predetermined site, is viewable at a remote site. The site where an image is captured is not limited to the office floor and may be any space that a user (or viewer) at a viewing site desires to remotely grasp, and examples of such a site include a school, a factory, a warehouse, a construction site, a server room, and a store.

As illustrated in FIG. 9, the image communication system 1 includes image capturing devices 10 (image capturing devices 10A and 10B) located at a plurality of sites (sites A and B), a communication management system 50, and communication terminals 30 (communication terminals 30A, 30C, and 30D) located at a plurality of sites (sites A, C, and D). The image capturing devices 10A and 10B are hereinafter referred to collectively as "image capturing devices 10" or individually as an "image capturing device 10" unless distinguished. The communication terminals 30A, 30C, and 30D are hereinafter referred to collectively as "communication terminals 30" or individually as a "communication terminal 30" unless distinguished.

The communication terminal 30 and the communication management system 50 of the image communication system 1 are capable of communicating with each other via a communication network 100. The communication network 100 includes the Internet, a mobile communication network, and a local area network (LAN), for example. The communication network 100 includes a network by not only wired communications but also a network by wireless communications such as 3rd generation (3G), 4th generation (4G), 5th generation (5G), Wireless Fidelity (Wi-Fi) (registered trademark), Worldwide Interoperability for Microwave Access (WiMAX), or Long Term Evolution (LTE).

The image capturing device 10 is a special digital camera, which captures an image of an object or surroundings such as scenery to obtain two hemispherical images, from which the spherical image is generated, as described above. The captured image obtained by the image capturing device 10 may be a video image or a still image, or may include both of a moving image and a still image. Further, the captured image may be managed together with audio. The captured image and the audio are provided in form of a video image. The communication terminal 30 distributes an image acquired from the image capturing device 10 via a wired cable such as a universal serial bus (USB) cable to another communication terminal 30 at a different site via the communication management system 50. In one example, the image capturing device 10A and the communication terminal 30A are located at the site A where users A1 and A2 are located. The image capturing device 10B is located at the site B where a user B1 is located, and is capable of directly communicating with the communication management system 50 via the communication network 100. The number of sites where the image capturing devices 10 are installed is not limited to two, and one site or three or more sites may be used. The connection between the image capturing device 10 and the communication terminal 30 may be a wireless connection using short-range wireless communication, for example, instead of a wired connection using a wired cable.

The communication terminal 30 is a computer such as a personal computer (PC) operated by a user at each site. The communication terminal 30 displays an image (a still image and/or a moving image) distributed from another site. For example, the communication terminal 30 acquires a spherical image, which is an image captured by the image capturing device 10, via the communication network 100. The communication terminal 30 is installed with OpenGL ES, which enables the communication terminal 30 to generate predetermined-area information indicating an area that is a part of the spherical image, or to generate a predetermined-area image from a spherical image that is transmitted from another communication terminal 30. That is, the communication terminal 30 is capable of displaying a predetermined area, which is a portion of an object appearing in the spherical image that is the captured image.

In one example, the communication terminal 30A is placed at the site A where the user A1 and the user A2 are located, and the communication terminal 30C is placed at the site C where a user C1 is located. The communication terminal 30D is placed at the site D where a user D1, a user D2, and a user D3 are located. The communication terminals 30C and 30D, which are placed at the sites C and D where no image capturing device 10 is located, respectively, distribute captured images of the sites C and D, which are obtained by cameras or the like of the communication terminals 30C and 30D, to other sites, respectively. At the site A where both the image capturing device 10A and the communication terminal 30A are located, the communication terminal 30A may distribute, to other sites, an image (spherical image) captured by the image capturing device 10A and an image captured by a camera or the like of the communication terminal 30A.

The arrangement of the terminals and devices (i.e., the communication terminals 30 and the image capturing devices 10) and the users illustrated in FIG. 9 is an example, and another example may be used. Examples of the communication terminal 30 are not limited to a PC, but include a tablet terminal, a mobile phone such as a smartphone, a wearable terminal, a projector, a video conference (teleconference) terminal, an interactive white board (IWB), and a telepresence robot. The IWB is an electronic whiteboard with mutual communication capability. When the image capturing device 10 includes a display, the image capturing device 10 may be configured to display an image distributed from another site.

The communication management system 50 manages and controls communication among the communication terminals 30 at the respective sites and manages types of image data (e.g., general image and special image) to be transmitted and received. In this embodiment, a special image is a spherical image, and a general image is a planar image. The communication management system 50 is provided, for example, at a service provider that provides video communication service.

The communication management system 50 may be configured by a single computer or a plurality of computers to which divided portions (functions) are arbitrarily allocated. All or a part of the functions of the communication management system 50 may be implemented by a server computer residing on a cloud network or a server computer residing on an on-premise network. The communication management system 50 thus may be referred to as a communication management server.

An existing system for distributing video data including a spherical image allows a viewer to change a display direction for the video data as desired. Such an existing system allows a viewer at each site to view an image corresponding to a different display direction, regardless of whether the video data is distributed live in real time or is recorded and distributed. In such a system for distributing a spherical image, a distributor may desire viewers to view an image corresponding to a synchronized display direction in a time period during which an object that the distributor desires the viewers to view appears on the image or in a time period during which an object that the distributor does not desire the viewers to view appears on the image. In the existing method, however, in the distribution of a spherical image, it is difficult to display an appropriate predetermined area on a communication terminal according to the demand of the distributor or a viewer such that the viewer is allowed to operate a display direction of an image to be displayed on the communication terminal as desired in a certain time period, whereas an image corresponding to a synchronized display direction is displayed on the communication terminal in some other time period.

To address such difficulty, in the image communication system 1, the communication management system 50 stores predetermined-area information corresponding to a reproduction time of video data including a spherical image transmitted from the communication terminal 30, and transmits, to the communication terminal 30, the video data and the predetermined-area information corresponding to the reproduction time when recording and distributing the video data. The communication terminal 30 reproduces the received video data such that a synchronized display direction is provided for the video data when the predetermined-area information corresponding to the reproduction time is present, whereas the user is allowed to operate a display direction for the video data as desired when the predetermined-area information corresponding to the reproduction time is not present. Accordingly, in the distribution of recorded video data including a spherical image, the image communication system 1 reflects a synchronized display direction for the recorded video data such that a viewer is allowed to operate a display direction for the video data as desired in a certain time period, whereas an image corresponding to the synchronized display direction is viewed in some other time period.

Hardware Configurations

Figure 10:
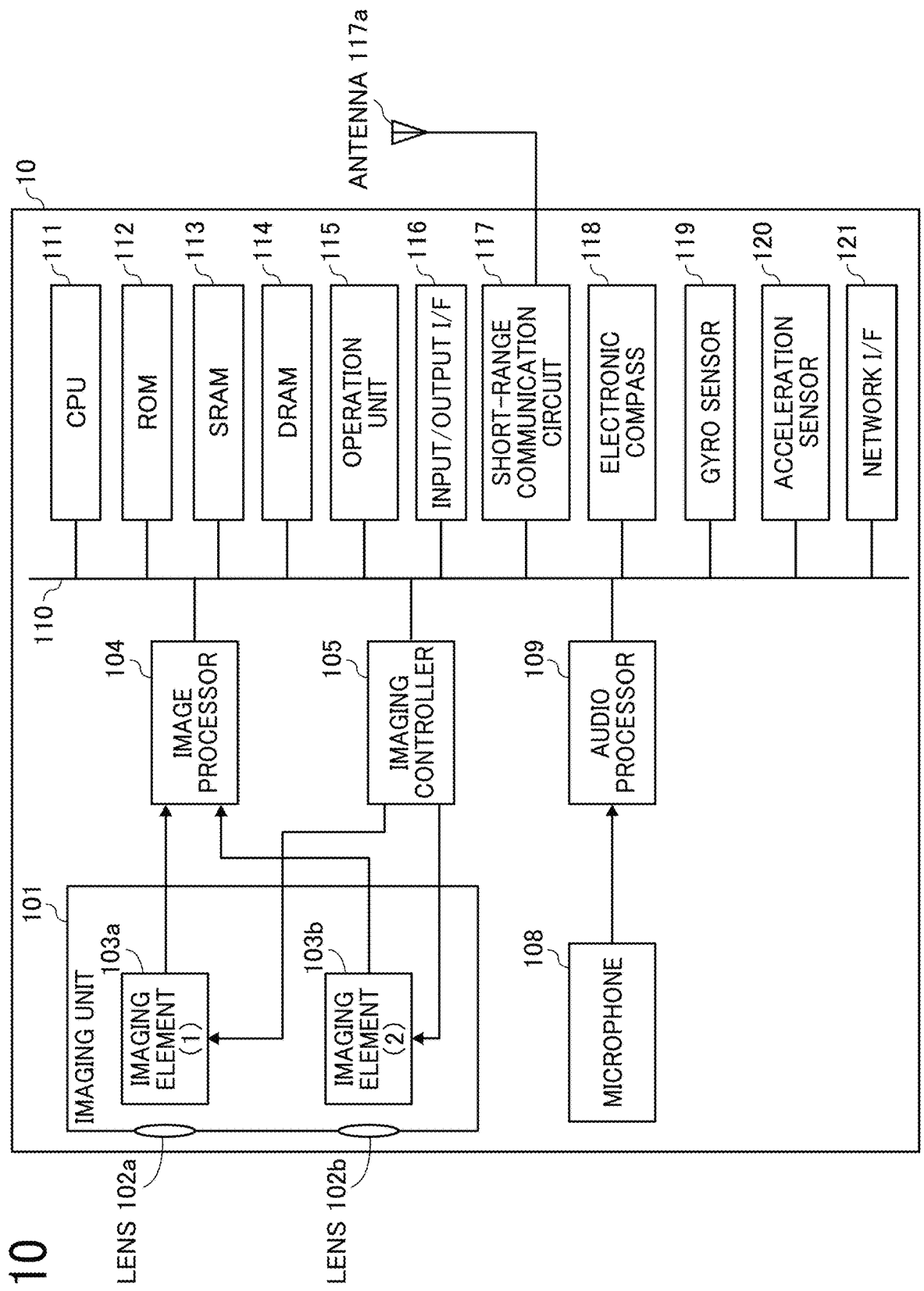
FIG. 10 is a diagram illustrating an example hardware configuration of the image capturing device according to embodiments.
Figure 11:
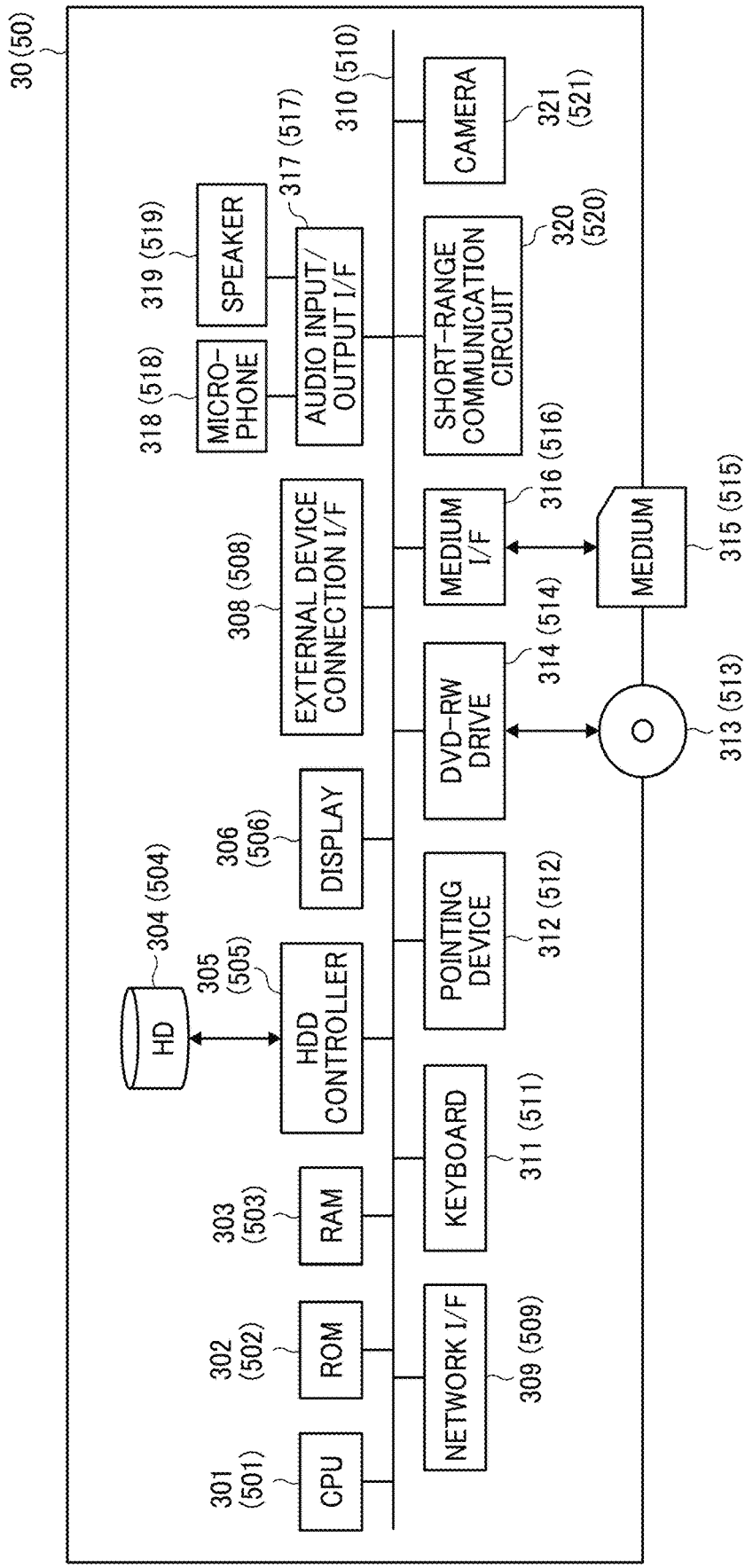
FIG. 11 is a diagram illustrating an example hardware configuration of a communication terminal and a communication management system according to embodiments.

Next, referring to FIGS. 10 and 11, hardware configurations of each apparatus, device, and terminal of the image communication system are described according to the embodiment. In the hardware configurations illustrated in FIGS. 10 and 11, components or elements may be added or deleted as needed.

Hardware Configuration of Image Capturing Device

First, referring to FIG. 10, a hardware configuration of the image capturing device 10 is described, according to the present embodiment. FIG. 10 is a diagram illustrating an example hardware configuration of the image capturing device 10. The following describes a case in which the image capturing device 10 is a spherical (omnidirectional) image capturing device having two imaging elements. However, the image capturing device 10 may include any suitable number of imaging elements, provided that it includes at least two imaging elements. In addition, the image capturing device 10 is not necessarily an image capturing device dedicated to omnidirectional image capturing. Alternatively, an external omnidirectional image capturing unit may be attached to a general-purpose digital camera or a smartphone to implement an image capturing device having substantially the same function as that of the image capturing device 10.

As illustrated in FIG. 10, the image capturing device 10 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, the operation unit 115, an input/output interface (I/F) 116, a short-range communication circuit 117, an antenna 117a for the short-range communication circuit 117, an electronic compass 118, a gyro sensor 119, an acceleration sensor 120, and a network I/F 121.

The imaging unit 101 includes two wide-angle lenses (so-called fish-eye lenses) 102a and 102b (collectively referred to as lens 102 unless they need to be distinguished from each other), each having an angle of view of equal to or greater than 180 degrees so as to form a hemispherical image. The imaging unit 101 further includes the two imaging elements 103a and 103b corresponding to the lenses 102a and 102b respectively. The imaging elements 103a and 103b each include an imaging sensor such as a complementary metal oxide semiconductor (CMOS) sensor or a charge-coupled device (CCD) sensor, a timing generation circuit, and a group of registers. The imaging sensor converts an optical image formed by the lenses 102a and 102b into electric signals to output image data. The timing generation circuit generates horizontal or vertical synchronization signals, pixel clocks and the like for the imaging sensor. Various commands, parameters, and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an inter-integrated circuit (I2C) bus. The image processor 104, the imaging controller 105, and the audio processor 109 are connected to the CPU 111 via a bus 110. Furthermore, the ROM 112, the SRAM 113, the DRAM 114, the operation unit 115, the input/output I/F 116, the short-range communication circuit 117, the electronic compass 118, the gyro sensor 119, the acceleration sensor 120, and the network I/F 121 are also connected to the bus 110.

The image processor 104 acquires image data from each of the imaging elements 103a and 103b via the parallel I/F bus and performs predetermined processing on each image data. Thereafter, the image processor 104 combines these image data to generate data of the equirectangular projection image as illustrated in FIG. 3C.

The imaging controller 105 usually functions as a master device while the imaging elements 103a and 103b each usually function as a slave device. The imaging controller 105 sets commands and the like in the group of registers of each of the imaging elements 103a and 103b via the serial I/F bus such as the I2C bus. The imaging controller 105 receives various commands from the CPU 111. Further, the imaging controller 105 acquires status data and the like of the group of registers of each of the imaging elements 103a and 103b via the serial I/F bus such as the I2C bus. The imaging controller 105 sends the acquired status data and the like to the CPU 111.

The imaging controller 105 instructs the imaging elements 103a and 103b to output the image data at a time when a shutter button of the operation unit 115 is pressed. In some cases, the image capturing device 10 displays a preview image on a display (e.g., a display of an external terminal such as a smartphone that performs short-range communication with the image capturing device 10 through the short-range communication circuit 117) or displays a moving image (movie). In case of displaying movie, the image data are continuously output from the imaging elements 103a and 103b at a predetermined frame rate (frames per minute).

Furthermore, the imaging controller 105 operates in cooperation with the CPU 111 to synchronize the time when the imaging element 103a outputs image data and the time when the imaging element 103b outputs the image data. It should be noted that, although the image capturing device 10 does not include a display in this embodiment, the image capturing device 10 may include the display. The microphone 108 converts sounds to audio data (signal). The audio processor 109 acquires the audio data output from the microphone 108 via an I/F bus and performs predetermined processing on the audio data.

The CPU 111 controls entire operation of the image capturing device 10, for example, by performing predetermined processing. The ROM 112 stores various programs for execution by the CPU 111. The SRAM 113 and the DRAM 114 each operate as a work memory to store programs loaded from the ROM 112 for execution by the CPU 111 or data in current processing. More specifically, in one example, the DRAM 114 stores image data currently processed by the image processor 104 and data of the equirectangular projection image on which processing has been performed.

The operation unit 115 collectively refers to various operation keys, a power switch, the shutter button, and a touch panel having functions of both displaying information and receiving input from a user, which can be used in combination. The user operates the operation unit 115 to input various image capturing (photographing) modes or image capturing (photographing) conditions.

The input/output I/F 116 collectively refers to an interface circuit such as a USB I/F that allows the image capturing device 10 to communicate data with an external medium such as a secure digital (SD) card or an external personal computer. The input/output I/F 116 supports at least one of wired and wireless communications. The data of the equirectangular projection image, which is stored in the DRAM 114, is stored in the external medium via the input/output I/F 116 or transmitted to an external terminal (apparatus) via the input/output I/F 116, as needed.

The short-range communication circuit 117 communicates data with the external terminal (apparatus) via the antenna 117a of the image capturing device 10 by short-range wireless communication such as near field communication (NFC), Bluetooth (registered trademark), or Wi-Fi. The short-range communication circuit 117 transmits the data of the equirectangular projection image to the external terminal (apparatus).

The electronic compass 118 calculates an orientation of the image capturing device 10 from the Earth's magnetism to output orientation information. This orientation information is an example of related information, which is metadata described in compliance with Exif. This information is used for image processing such as image correction of captured images. The related information also includes a date and time when the image is captured by the image capturing device 10, and a data size of the image data. The gyro sensor 119 detects the change in angle of the image capturing device 10 (roll, pitch, yaw) with movement of the image capturing device 10. The change in angle is one example of related information (metadata) described in compliance with Exif. This information is used for image processing such as image correction of captured images. The acceleration sensor 120 detects acceleration in three axial directions. The image capturing device 10 calculates position (an angle with respect to the direction of gravity) of the image capturing device 10, based on the acceleration detected by the acceleration sensor 120. With the gyro sensor 119 and the acceleration sensor 120, the image capturing device 10 is able to correct tilt of images with high accuracy. The network I/F 121 is an interface for performing data communication, via a router or the like, using the communication network 100 such as the Internet.

Hardware Configuration of Communication Terminal

FIG. 11 is a diagram illustrating an example hardware configuration of the communication terminal 30. Each hardware element of the communication terminal 30 is denoted by a reference numeral in 300 series. The communication terminal 30 is implemented by one or more computers. As illustrated in FIG. 11, the communication terminal 30 includes a CPU 301, a ROM 302, a RAM 303, a hard disk (HD) 304, a hard disk drive (HDD) controller 305, a display 306, an external device connection I/F 308, a network I/F 309, a bus line 310, a keyboard 311, a pointing device 312, a digital versatile disc rewritable (DVD-RW) drive 314, a medium I/F 316, an audio input/output I/F 317, a microphone 318, a speaker 319, a short-range communication circuit 320, and a camera 321.

The CPU 301 controls entire operation of the communication terminal 30. The ROM 302 stores a control program for driving the CPU 301 such as an initial program loader (IPL). The RAM 303 is used as a work area for the CPU 301. The HD 304 stores various data such as a control program. The HDD controller 305 controls reading or writing of various data to or from the HD 304 under control of the CPU 301. The display 306 displays various information such as a cursor, a menu, a window, characters, or an image. The display 306 is an example of a display (display device). In one example, the display 306 is a touch panel display provided with an input device (input means). The external device connection I/F 308 is an interface for connecting to various external devices. Examples of the external devices include, but are not limited to, a USB memory and a printer. The network I/F 309 is an interface that controls communication of data through the communication network 100. The bus line 310 is an address bus or a data bus, which electrically connects the elements in FIG. 11 such as the CPU 301.

The keyboard 311 is an example of an input device including a plurality of keys for inputting characters, numerical values, various instructions, and the like. The pointing device 312 is an example of an input device that allows a user to select or execute a specific instruction, select a target for processing, or move a cursor being displayed. The input device is not limited to the keyboard 311 and the pointing device 312, and may be a touch panel, a voice input device, or the like. The DVD-RW drive 314 reads and writes various data from and to a DVD-RW 313, which is an example of a removable recording medium. In alternative to the DVD-RW, any recording medium may be used such as a digital versatile disc recordable (DVD-R) or Blu-ray Disc (registered trademark). The medium I/F 316 controls reading or writing (storing) of data with respect to a recording medium 315 such as a flash memory. The microphone 318 is an example of an audio collecting device, which is of a built-in type, capable of inputting audio under control of the CPU 301. The audio input/output I/F 317 is a circuit for inputting or outputting an audio signal to the microphone 318 or from the speaker 319 under control of the CPU 301. The short-range communication circuit 320 communicates data with the external terminal (apparatus) by short-range wireless communication such as NFC, Bluetooth, or Wi-Fi. The camera 321 is an example of a built-in imaging device capable of capturing a target to obtain captured image data. Note that the microphone 318, the speaker 319, or the camera 321 may be an external device in alternative to the built-in device of the communication terminal 30.

Hardware Configuration of Communication Management System

FIG. 11 is a diagram illustrating an example hardware configuration of the communication management system 50. Each hardware element of the communication management system 50 is denoted by a reference numeral in 500 series. The communication management system 50 is implemented by one or more computers and has substantially the same configuration as that of the communication terminal 30 as illustrated in FIG. 11, and thus the description of the hardware configuration is omitted.

Further, any one of the above-described control programs may be recorded in a file in a format installable or executable on a computer-readable recording medium for distribution. Examples of the recording medium include a compact disc recordable (CD-R), a digital versatile disc (DVD), Blu-ray Disc, an SD card, and a USB memory. In addition, such recording media may be provided in the domestic markets or foreign markets as program products. For example, the communication terminal 30 executes the control program to implement an image display method according to an embodiment of the present disclosure.

Functional Configuration

Figure 12:
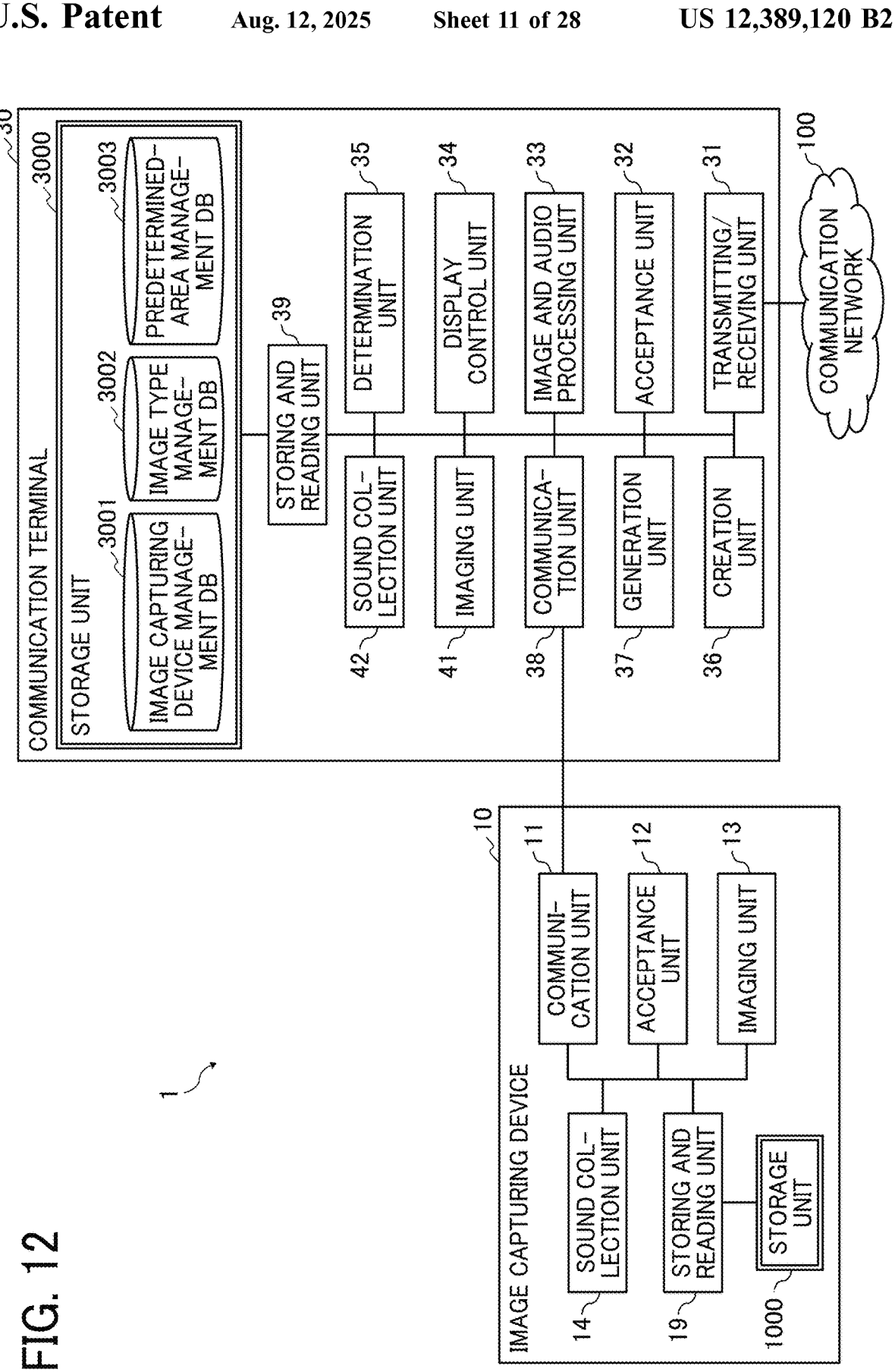
FIG. 12 is a diagram illustrating an example functional configuration of the image communication system according to embodiments.
Figure 13:
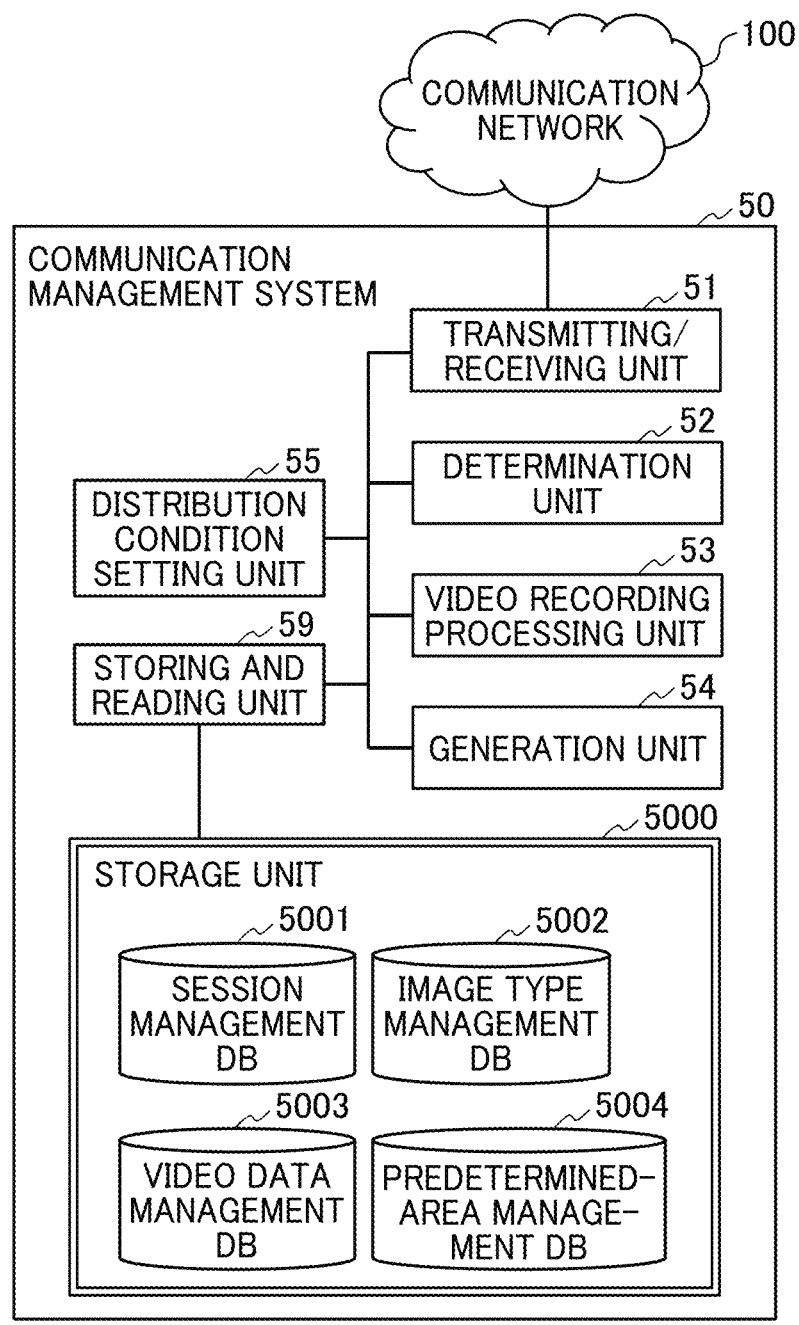
FIG. 13 is a diagram illustrating an example functional configuration of the image communication system according to embodiments.

Referring to FIGS. 12 to 20, a functional configuration of the image communication system 1 is described according to the embodiment. FIGS. 12 and 13 are diagrams illustrating an example functional configuration of the image communication system 1 according to the embodiment. FIGS. 12 and 13 illustrate some of the devices and terminals illustrated in FIG. 9, which are related to processing or operation to be described below.

Functional Configuration of Image Capturing Device

Referring to FIG. 12, a functional configuration of the image capturing device 10 is described according to the embodiment. The image capturing device 10 includes a communication unit 11, an acceptance unit 12, an imaging unit 13, a sound collection unit 14, and a storing and reading unit 19. These units are functions that are implemented by or caused to function by operating any of the hardware elements illustrated in FIG. 10 in cooperation with the instructions of the CPU 111 according to the control program for the image capturing device expanded from the SRAM 113 to the DRAM 114. The image capturing device 10 further includes a storage unit 1000, which is implemented by the ROM 112, the SRAM 113, and the DRAM 114 illustrated in FIG. 10. The storage unit 1000 stores a Globally Unique Identifier (GUID) identifying the own device (i.e., the image capturing device 10).

The communication unit 11 is implemented by instructions of the CPU 111, and transmits or receives various data or information to or from any other device or terminal. The communication unit 11 communicates data with any other device or terminal using, for example, the short-range communication circuit 117, based on short-range wireless communication technology. For example, the communication unit 11 communicates data with any other device or terminal via any desired cable through the input/output I/F 116. Furthermore, the communication unit 11 communicates data with any other device or terminal via the communication network 100 through the network I/F 121.

The acceptance unit 12 is implemented by the operation unit 115, which operates according to instructions of the CPU 111, and receives various selections or inputs from the user. The imaging unit 13 is implemented by the imaging unit 101, the image processor 104, and the imaging controller 105, each operating according to instructions of the CPU 111. The imaging unit 13 captures an image of an object or surroundings (for example, scenery) to obtain captured image data. The sound collection unit 14 is implemented by the microphone 108 and the audio processor 109, each operating according to instructions of the CPU 111. The sound collection unit 14 collects sounds around the image capturing device 10.

The storing and reading unit 19 is implemented by instructions of the CPU 111, and stores various data or information in the storage unit 1000 or reads out various data or information from the storage unit 1000.

Functional Configuration of Communication Terminal

Next, a functional configuration of the communication terminal 30 is described with reference to FIG. 12. The communication terminal 30 includes a transmitting/receiving unit 31, an acceptance unit 32, an image and audio processing unit 33, a display control unit 34, a determination unit 35, a creation unit 36, a generation unit 37, a communication unit 38, an imaging unit 41, a sound collection unit 42, and a storing and reading unit 39. These units are functions that are implemented by or caused to function by operating any of the hardware elements illustrated in FIG. 11 in cooperation with the instructions of the CPU 301 according to the control program for the communication terminal expanded from the HD 304 to the RAM 303. The communication terminal 30 further includes a storage unit 3000, which is implemented by the ROM 302, the RAM 303, and the HD 304 illustrated in FIG. 11.

The transmitting/receiving unit 31 (example of receiving means) is implemented by the network I/F 309, which operates according to instructions of the CPU 301, and transmits or receives various data or information to or from any other device or terminal through the communication network 100.

The acceptance unit 32 is implemented by the keyboard 311 or the pointing device 312, which operates according to instructions of the CPU 301, and receives various selections or inputs from the user.

The image and audio processing unit 33 is implemented by instructions of the CPU 301, and performs image processing on captured image data acquired by the image capturing device 10 or acquired by the camera 321 capturing an object. The image and audio processing unit 33 further processes audio data, based on audio signals, which are converted from voice of the user by the microphone 318. For example, the image and audio processing unit 33 performs image processing on captured image data received from the image capturing device 10 or obtained by the camera 321, based on image type information such as the source name so that the display control unit 34 causes the display 306 to display an image. Specifically, when the image type information indicates the special image, the image and audio processing unit 33 converts the captured image data (e.g., data of hemispherical images as illustrated in FIGS. 3A and 3B) into data of a spherical image as illustrated in FIG. 4B to create spherical image data.

Further, the image and audio processing unit 33 performs image processing on captured image data distributed from another communication terminal 30. Further, the image and audio processing unit 33 outputs a voice signal of audio data distributed from another communication terminal 30 via the communication management system 50 to the speaker 319 and outputs a voice from the speaker 319.

The display control unit 34 is implemented by instructions of the CPU 301, and controls the display 306 to display various screens including various images or texts. The determination unit 35 is implemented by instructions of the CPU 301, and performs various determinations. For example, the determination unit 35 determines the image type of the captured image data received from the image capturing device 10 or obtained by the camera 321.

The creation unit 36 is implemented by instructions of the CPU 301. The creation unit 36 generates a source name, which is one example of the image type information, according to a naming rule, based on a determination result generated by the determination unit 35 and indicating a general image or a special image (that is, a spherical image in this disclosure). For example, when the determination unit 35 determines that the image type corresponding to the received captured image data is a general image, the creation unit 36 generates the source name "Video" that indicates a general image type. By contrast, when the determination unit 35 determines that the image type corresponding to the received captured image data is a special image, the creation unit 36 generates the source name "Video_Theta" that indicates a special image type.

The generation unit 37 is implemented by instructions of the CPU 301, and generates a predetermined-area image to be displayed on the display 306. For example, to display on the display 306 an image of a predetermined area corresponding to predetermined-area information indicating a predetermined area in an image captured by the image capturing device 10 or predetermined-area information received by the transmitting/receiving unit 31, the generation unit 37 applies perspective projection conversion to the captured image (spherical image) using the predetermined-area information to generate a predetermined-area image corresponding to the predetermined-area information.

The communication unit 38 is implemented by the short-range communication circuit 320 that operates according to instructions of the CPU 301, and communicates with the communication unit 11 of the image capturing device 10 using short-range wireless communication technology such as NFC, Bluetooth, or WiFi. In the above description, the communication unit 38 and the transmitting/receiving unit 31 are independent from each other; however, the communication unit 38 and the transmitting/receiving unit 31 may be configured as a single unit.

The imaging unit 41 is implemented by the camera 321 that operates according to instructions of the CPU 301, and captures an object such as scenery to acquire captured image data. The sound collection unit 42 is implemented by the microphone 318 and the audio input/output I/F 317, which operate according to instructions of the CPU 301, and collects sounds around the communication terminal 30.

The storing and reading unit 39 is implemented by instructions of the CPU 301, and stores various data or information in the storage unit 3000 or reads out various data or information from the storage unit 3000.

Image Type Management Table

FIG. 14 is a conceptual view illustrating an example of an image type management table. The storage unit 3000 includes an image type management DB 3002. The image type management DB 3002 is made up of the image type management table illustrated in FIG. 14. In the image type management table, an image data ID, an Internet Protocol (IP) address, which is an example of an address, of a transmission source terminal, and a source name are managed in association with each other. The image data ID is one example of image data identification information identifying image data to be distributed. The same identical image data ID is assigned to image data transmitted from the same transmission source terminal. By the image data ID, a transmission destination terminal (namely, a communication terminal that receives the image data) identifies the transmission source terminal of the received image data. The IP address of the transmission source terminal is the IP address of the image capturing device 10 or the communication terminal 30 that transmits image data identified by the corresponding image data ID, which is associated with the IP address. The source name, which is associated with the corresponding image data ID, is a name for identifying the image capturing device 10 or the camera 321 that outputs image data identified by the corresponding image data ID, which is associated with the source name. The source name is one example of image type information. The source name is a name generated by the communication terminal 30 according to a predetermined naming rule.

For example, five transmission source terminals having the IP addresses "1.2.1.3", "1.2.2.3", "1.3.1.3", "1.3.2.3", and "1.2.2.5" have transmitted image data indicated by image data IDs "RS001", "RS002", "RS003", "RS004", and "RS005", respectively. It is also indicated that the image types indicated by the source names of the five transmission source terminals are "Video_Theta", "Video_Theta", "Video", "Video", and "Video_Theta", which indicate the image types "special image", "special image", "general image", "general image", and "special image", respectively. In this embodiment, a special image is a spherical image, and a general image is a planar image. The IP address is an example of destination information, and the destination information may be a media access control (MAC) address, a terminal identification (ID), or the like. Although the IP address is represented by simplifying the IPv4 address, the IP address may be IPv6. In addition, data other than the image data may be stored in the image type management table in association with the image data ID. Examples of the data other than the image data include audio data and presentation material data to be shared on a screen.

Image Capturing Device Management Table

FIG. 15 is a conceptual view illustrating an example of an image capturing device management table. The storage unit 3000 includes an image capturing device management DB 3001. The image capturing device management DB 3001 is made up of the image capturing device management table illustrated in FIG. 15. The image capturing device management table stores a vendor ID and a product ID, obtainable from the GUID of the image capturing device 10 that is configured to obtain two hemispherical images, from which a spherical image is generated. As the GUID, a combination of a vendor ID (VID) and a product ID (PID) used in a USB device is used, for example. The vendor ID and the product ID may be stored in the communication terminal 30 before shipment or after shipment.

Predetermined-Area Management Table

FIG. 16 is a conceptual view illustrating an example of a predetermined-area management table. The storage unit 3000 includes a predetermined-area management DB 3003. The predetermined-area management DB 3003 is made up of the predetermined-area management table illustrated in FIG. 16. In the predetermined-area management table, a time stamp indicating the reproduction time of video data, which is captured image data, and predetermined-area information indicating a predetermined-area image to be displayed on the communication terminal 30 are managed in association with each other. The predetermined-area information is a conversion parameter used to convert a captured image to an image (predetermined-area image) of a predetermined area T of the captured image, as illustrated in FIG. 6A, FIG. 6B, and FIG. 7.

For example, the predetermined-area management table illustrated in FIG. 16 manages, in the first row, information indicating that video data having the reproduction time corresponding to the time stamp "10001" is to be displayed in a predetermined area (r=10, θ=20, ϕ=30). The predetermined-area management table illustrated in FIG. 16 manages, in the second row, information indicating that video data having the reproduction time corresponding to the time stamp "10002" is to be displayed in a predetermined area (r=20, θ=30, ϕ=40). The predetermined-area management table illustrated in FIG. 16 manages, in the fourth row, information indicating that video data having the reproduction time corresponding to the time stamp "10004" is to be displayed in a predetermined area (r=20, θ=20, ϕ=30). By contrast, the predetermined-area management table illustrated in FIG. 16 stores no predetermined-area information in the third row, and manages information indicating that a synchronized display direction of the predetermined-area image is not provided for the video data having the reproduction time corresponding to the time stamp "10003". When the transmitting/receiving unit 31 receives new predetermined-area information corresponding to a time stamp of video data that has already been managed, the storing and reading unit 39 rewrites the managed predetermined-area information to the received new predetermined-area information.

Functional Configuration of Communication Management System

Next, referring to FIG. 13, a description is given of the functional configuration of the communication management system 50 according to the embodiment. The communication management system 50 includes a transmitting/receiving unit 51, a determination unit 52, a video recording processing unit 53, a generation unit 54, a distribution condition setting unit 55, and a storing and reading unit 59. These units are functions that are implemented by or caused to function by operating any of the hardware elements illustrated in FIG. 11 in cooperation with the instructions of the CPU 501 according to the control program for the communication management system expanded from the HD 504 to the RAM 503. The communication management system 50 further includes a storage unit 5000, which is implemented by the ROM 502, the RAM 503, and the HD 504 illustrated in FIG. 11.

The transmitting/receiving unit 51 is implemented by the network I/F 509, which operates according to instructions of the CPU 501, and transmits or receives various data or information to or from any other device or terminal through the communication network 100.

The determination unit 52 is implemented by instructions of the CPU 501, and performs various determinations. The video recording processing unit 53 is implemented by instructions of the CPU 501, and records video data transmitted from the communication terminals 30. The video data includes captured image data and audio data. For example, when the data transmitted from each of the communication terminals 30 is video data, the video recording processing unit 53 individually stores the received video data as a recording file, and stores metadata (bibliographic information) in a video data management DB 5003.

The generation unit 54 is implemented by instructions of the CPU 501, and generates an image data ID and predetermined-area information. The generation unit 54 generates, for example, predetermined-area information. The predetermined-area information indicates a predetermined area (e.g., the predetermined area T illustrated in FIG. 5 and the like) in an image captured by the image capturing device 10. An image in which the entire captured image is displayed (e.g., the spherical image CE illustrated in FIG. 5 and the like) is also referred to as an "entire image".

The distribution condition setting unit 55 is implemented by instructions of the CPU 501, and sets distribution conditions for distributing the video data recorded by the video recording processing unit 53 to the communication terminals 30 at the respective sites. For example, the distribution condition setting unit 55 sets, in association with a time stamp indicating a reproduction time of the recorded video data, predetermined-area information corresponding to the reproduction time.

The storing and reading unit 59 is implemented by instructions of the CPU 501, and stores various data or information in the storage unit 5000 or reads out various data or information from the storage unit 5000.

Session Management Table

FIG. 17 is a conceptual view illustrating an example of a session management table. The storage unit 5000 includes a session management DB 5001. The session management DB 5001 is made up of the session management table illustrated in FIG. 17. In the session management table, a session ID and an IP address of a participant communication terminal are managed in association with each other. The session ID is an example of session identification information identifying a communication session for implementing image communication. The session ID is generated for each virtual room. The session ID is also managed by each communication terminal, and is used when each communication terminal selects a communication session. The IP address of the participant communication terminal indicates the IP address of the communication terminal 30 participating in a virtual room indicated by the session ID, which is associated with the IP address.

Image Type Management Table

FIG. 18 is a conceptual view illustrating an example of an image type management table. The storage unit 5000 includes an image type management DB 5002. The image type management DB 5002 is made up of the image type management table illustrated in FIG. 18. In the image type management table, the information managed by the image type management table illustrated in FIG. 14 and the same session ID as the session ID managed in the session management table illustrated in FIG. 17 are managed in association with each other. The communication management system 50 manages an image data ID, an IP address of a transmission source terminal, and image type information, which are the same as those managed in the communication terminal 30, because, for example, when a new communication terminal 30 enters a virtual room, the communication management system 50 transmits information including the image type information to a communication terminal 30 that has already been in video communication and the new communication terminal 30, which has just participated in the video communication. As a result, the communication terminal 30 that has already been in the video communication and the communication terminal 30 that has just participated in the video communication do not have to transmit and receive such information including the image type information.

Video Data Management Table

FIG. 19 is a conceptual view illustrating an example of a video data management table. The storage unit 5000 includes the video data management DB 5003. The video data management DB 5003 is made up of the video data management table illustrated in FIG. 19. In the video data management table, an IP address of the communication terminal 30 or the image capturing device 10 from which captured image data is transmitted, and a recorded data file of video data, which is the captured image data, are managed in association with each other.

Predetermined-Area Management Table

FIG. 20 is a conceptual view illustrating an example of a predetermined-area management table. The storage unit 5000 includes a predetermined-area management DB 5004. The predetermined-area management DB 5004 is made up of the predetermined-area management table illustrated in FIG. 20. In the predetermined-area management table, for each recorded data file of video data, an IP address of a transmission source terminal of captured image data, an IP address of the communication terminal 30 to which the captured image data is to be transmitted, a time stamp, and predetermined-area information are managed in association with each other. The time stamp indicates a reproduction time of the video data, which is the captured image data. The predetermined-area information indicates a predetermined-area image to be displayed on the communication terminal 30. The predetermined-area information is a conversion parameter used to convert a captured image to an image (predetermined-area image) of a predetermined area T of the captured image, as illustrated in FIG. 6A, FIG. 6B, and FIG. 7.

For example, the predetermined-area management table illustrated in FIG. 20 manages, in the first row, information indicating that video data having the reproduction time corresponding to the time stamp "10001" is to be transmitted from the communication terminal 30 having the IP address "1.2.1.3" to the communication terminal 30 having the IP address "1.3.1.3" via the communication management system 50 and that the predetermined area (r=10, θ=20, φ=30) is to be displayed on the communication terminal 30 as the transmission destination. As indicated in the second and third rows of the predetermined-area management table illustrated in FIG. 20, when the IP address of the image transmission destination is "all", the communication management system 50 transmits predetermined-area information corresponding to each of the time stamps, which are associated with the IP address "all", to all of the communication terminals 30 to which the video data is to be distributed, and causes all of the communication terminals 30 to display the same predetermined area.

As indicated in the third and sixth rows of the predetermined-area management table illustrated in FIG. 20, when no predetermined-area information is stored, the communication management system 50 does not transmit predetermined-area information corresponding to each of the respective time stamps to the communication terminal(s) 30 (or image transmission destination(s)) to which the video data is to be distributed, or does not cause the communication terminal(s) 30 to display the predetermined-area image in a synchronized display direction. As indicated in the fourth and fifth rows of the predetermined-area management table illustrated in FIG. 20, when different image transmission destinations or different pieces of predetermined-area information are stored for the same image transmission source and time stamp, the communication management system 50 transmits pieces of predetermined-area information, each corresponding to the associated time stamp, to the communication terminals 30 serving as the corresponding image transmission destinations, and causes each of the communication terminals 30 to display a different predetermined area.

When the transmitting/receiving unit 51 receives new predetermined-area information corresponding to a set of the IP address of a communication terminal from which captured image data is transmitted, the IP address of a communication terminal to which the captured image data is to be transmitted, and the time stamp of the video data, the set having already been managed, the storing and reading unit 59 rewrites the managed predetermined-area information to the received new predetermined-area information. The time stamp is an example of time information indicating a reproduction time of the video data. The time stamp indicates a time indicating a reproduction position within the total reproduction time of the video data in the recorded data file. The time stamp may record a time at which captured image data, which is the video data, is received from the image transmission source to represent the reproduction time of the video data.

Processes or Operations According to Embodiment

Session Participation Process

Next, referring to FIGS. 21 to 33, processes and operations of the image communication system 1 according to the embodiment are described. In the following description, a captured image obtained at the site A is distributed to various sites, by way of example. However, similar processing is performed for distribution of an image from another site.

Figure 21:
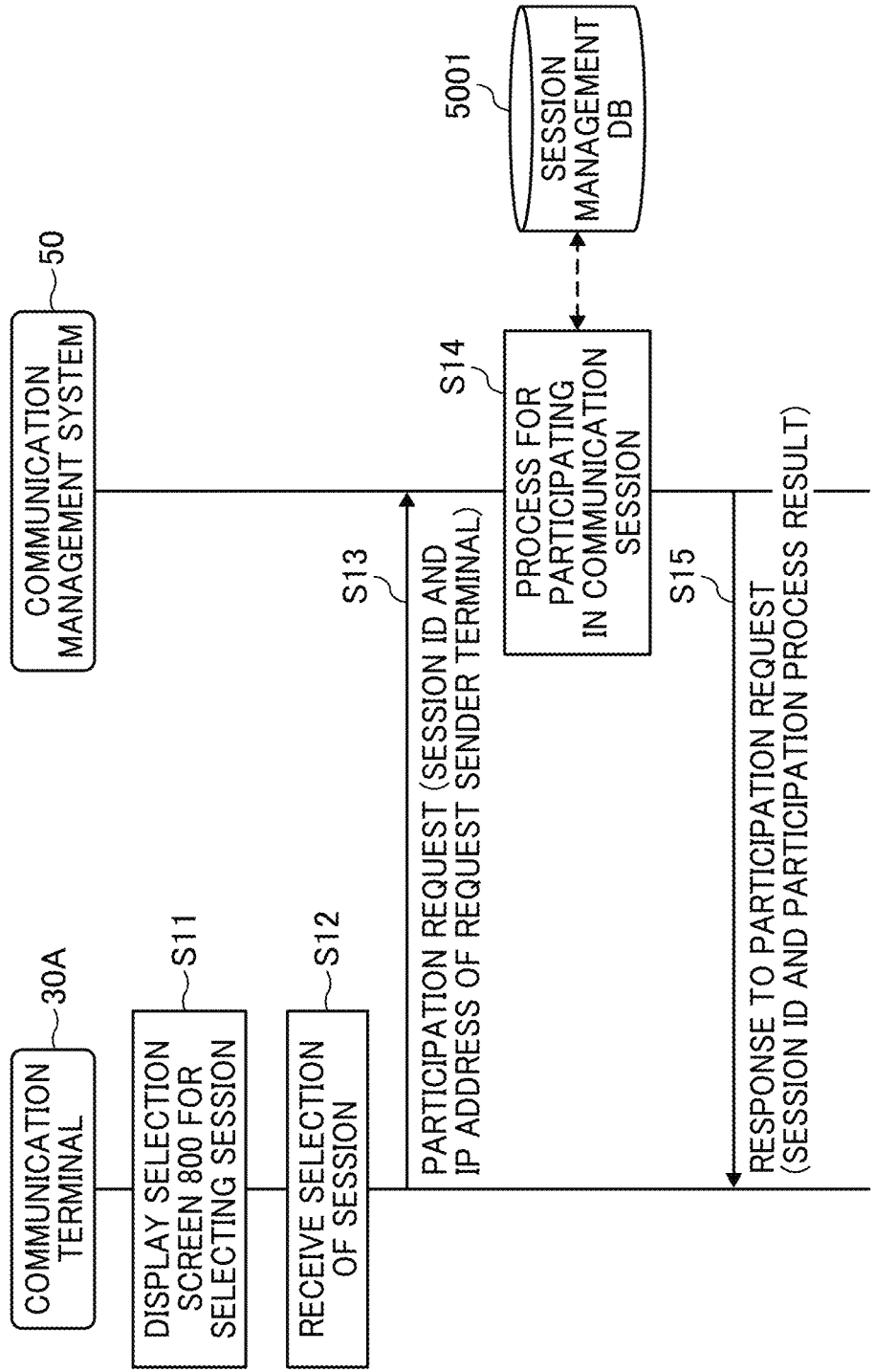
FIG. 21 is a sequence diagram illustrating operation of processing a request for participation in a communication session, performed by the image communication system, according to embodiments.
Figure 22:
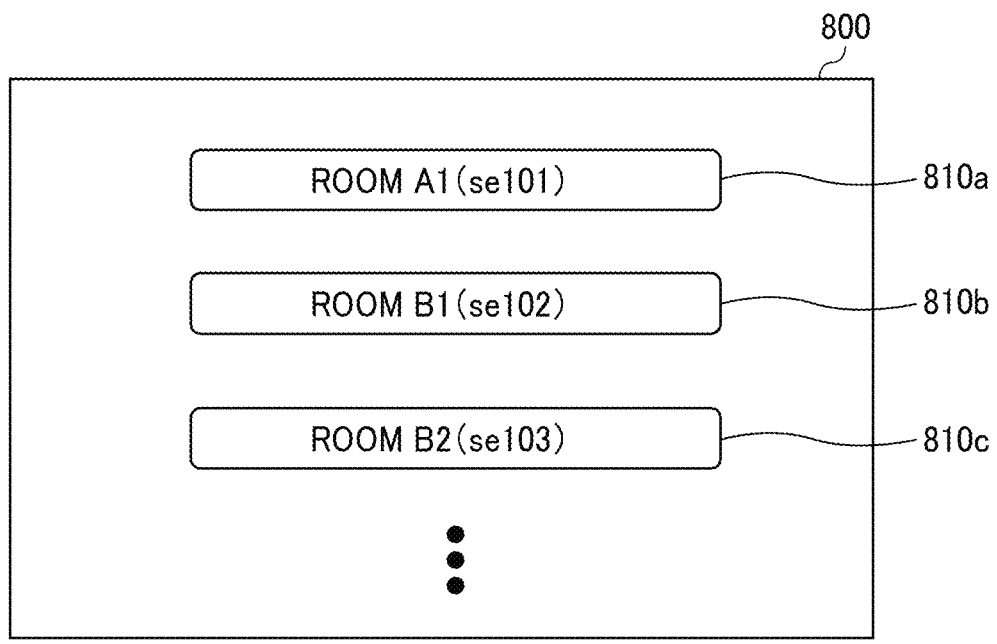
FIG. 22 is a diagram illustrating an example of a selection screen for selecting a session, according to embodiments.

Referring to FIGS. 21 and 22, operation of processing a request for participation in a communication session is described, according to the embodiment. FIG. 21 is a sequence diagram illustrating operation of processing a request for participation in a communication session, performed by the image communication system 1, according to the embodiment. FIG. 22 is a diagram illustrating an example of a selection screen 800 for selecting a session.

When a user at the site A (e.g., the user A1) operates the communication terminal 30A to display a session selection screen for selecting a communication session, the acceptance unit 32 receives an instruction for displaying the session selection screen. The display control unit 34 of the communication terminal 30A causes the display 306 to display the selection screen 800 as illustrated in FIG. 22 (S11). The selection screen 800 illustrated in FIG. 22 displays selection buttons 810a, 810b, and 810c, which correspond to rooms A1, B1, and B2, respectively, for selection. Each of the selection buttons 810a, 810b, and 810c is associated with a corresponding session ID.

When the user A1 selects a selection button (in this example, the selection button 810a) corresponding to a desired virtual room as the desired site, the acceptance unit 32 of the communication terminal 30A receives selection of a corresponding communication session (S12). Then, the transmitting/receiving unit 31 of the communication terminal 30A transmits to the communication management system 50 a participation request to participate in the communication session with another site (S13). This participation request includes a session ID identifying the communication session for which the selection is received at S12, and the IP address of the communication terminal 30A, which is a request sender terminal. The communication management system 50 receives the participation request at the transmitting/receiving unit 51.

Next, the storing and reading unit 59 of the communication management system 50 performs a process for causing the communication terminal 30A to participate in the communication session (S14). More specifically, the storing and reading unit 59 adds, in the session management DB 5001 (FIG. 17), the IP address that is received at S13 to a field of the participant terminal IP address in a record of the session ID that is the same as the session ID received at S13. The transmitting/receiving unit 51 transmits a response to the participation request to the communication terminal 30A (S15). The response to the participation request includes the session ID received at S13 and the result of the participation process performed at S14. The communication terminal 30A receives the response to the participation request at the transmitting/receiving unit 31. The following describes a case where the operation for causing the communication terminal 30A to participate in the communication session, namely, the participation process, is successfully completed. Through a process similar to the process illustrated in FIG. 21, the communication terminals 30 at the respective sites perform a process for participating in the communication session.

Operation of Managing Image Type Information

Figure 23:
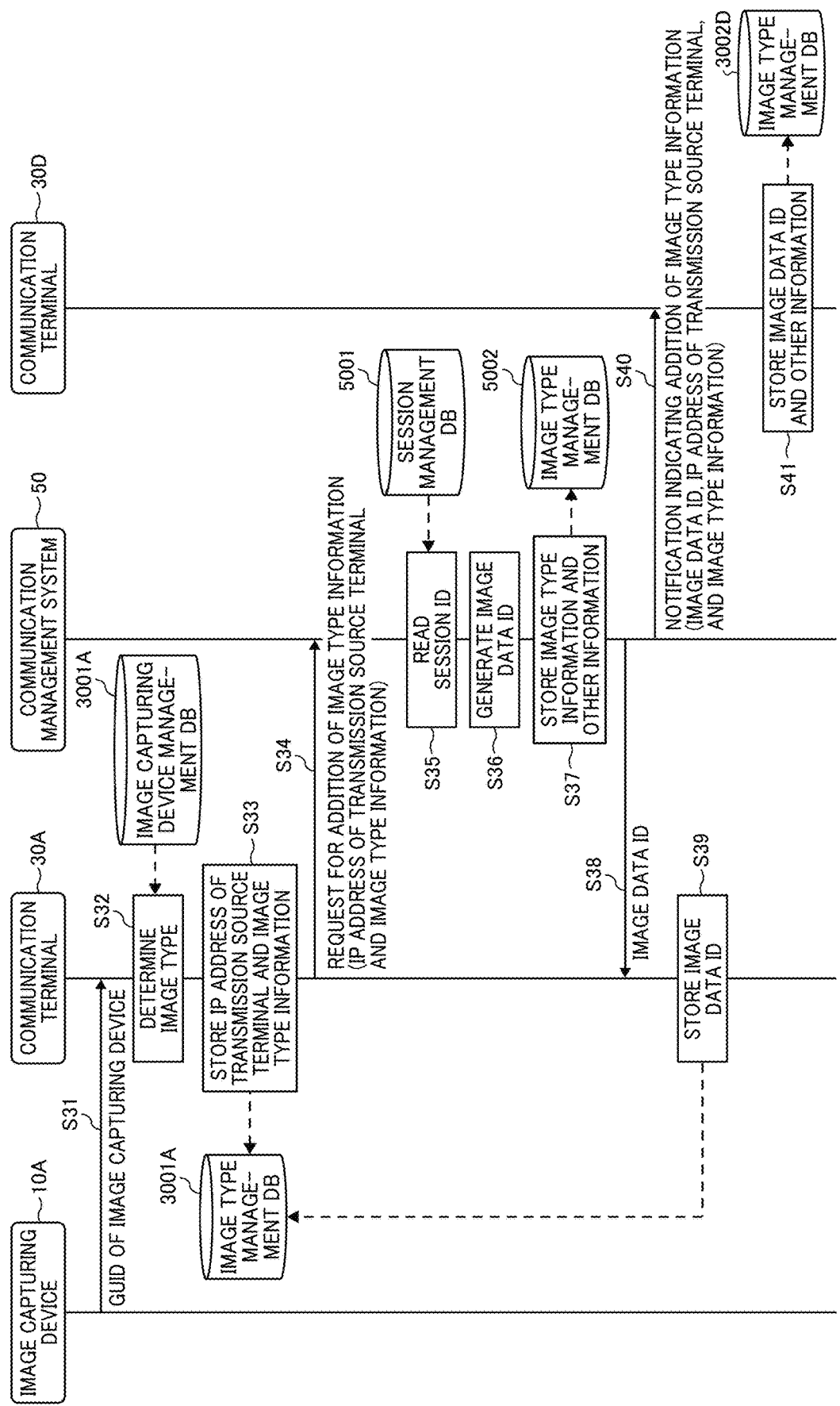
FIG. 23 is a sequence diagram illustrating operation of managing image type information, performed by the image communication system, according to embodiments.

Next, referring to FIG. 23, operation of managing the image type information is described, according to the embodiment. FIG. 23 is a sequence diagram illustrating operation of managing the image type information, performed by the image communication system 1, according to the embodiment.

When a user at the site A connects the image capturing device 10A to the communication terminal 30A, the storing and reading unit 19 of the image capturing device 10A reads the GUID of the own device (i.e., the image capturing device 10A) stored in the storage unit 1000. Then, the communication unit 11 of the image capturing device 10A transmits the GUID of the image capturing device 10A to the communication terminal 30A (S31). Thus, the communication unit 38 of the communication terminal 30A receives the GUID of the image capturing device 10A.

The determination unit 35 of the communication terminal 30A determines whether a vendor ID and a product ID, which are the same as a vendor ID and a product ID of the GUID received at S31, are stored in the image capturing device management DB 3001 (see FIG. 15) to determine the image type (S32). More specifically, the determination unit 35 of the communication terminal 30A determines that the image capturing device 10A is an image capturing device that captures a special image (a spherical image, in this embodiment), when the same vender ID and product ID are stored in the image capturing device management DB 3001. By contrast, the determination unit 35 of the communication terminal 30A determines that the image capturing device 10A is an image capturing device that captures a general image, when the same vender ID and product ID are not stored in the image capturing device management DB 3001.

Then, the storing and reading unit 39 of the communication terminal 30A stores, in the image type management DB 3002 (hereinafter also referred to as the "image type management DB 3002A" when distinguished from those of the other communication terminals 30; the same applies to the other communication terminals 30) (see FIG. 14), the IP address of the transmission source terminal (i.e., the communication terminal 30A), and image type information indicating the determination result obtained at S32 in association with each other (S33). In this state, any image data ID is not yet associated. Examples of the image type information include a source name, which is determined according to the naming rule, and an image type (general image or special image).

Next, the transmitting/receiving unit 31 of the communication terminal 30A transmits a request for addition of the image type information to the communication management system 50 (S34). The request for addition of the image type information includes the IP address of the transmission source terminal (i.e., the communication terminal 30A) and the image type information, which are stored at S33. The communication management system 50 receives the request for addition of the image type information at the transmitting/receiving unit 51.

Subsequently, the storing and reading unit 59 of the communication management system 50 refers to the session management DB 5001 (see FIG. 17) using the IP address of the transmission source terminal, which is received at S34, as a search key, to search for and read the session ID associated with the IP address (S35).

Next, the generation unit 54 generates a unique image data ID (S36). Then, the storing and reading unit 59 adds, in the image type management DB 5002 (see FIG. 18), a new record associating the session ID read at S35, the image data ID generated at S36, and the IP address of the transmission source terminal and the image type information, which are received at S34, with one another (S37). The transmitting/receiving unit 51 transmits the image data ID generated at S36 to the communication terminal 30A (S38). The communication terminal 30A receives the image data ID at the transmitting/receiving unit 31.

Then, the storing and reading unit 39 of the communication terminal 30A stores, in the image type management DB 3002A (see FIG. 14), the image data ID received at S38 in association with the IP address of the transmission source terminal (i.e., the communication terminal 30A) and the image type information, which are stored at S33 (S39).

Further, the transmitting/receiving unit 51 of the communication management system 50 transmits a notification indicating the addition of the image type information to another communication terminal 30 (in the illustrated example, the communication terminal 30D) (S40). The notification indicating the addition of the image type information includes the image data ID generated at S36, and the IP address of the transmission source terminal (i.e., the communication terminal 30A) and the image type information, which are stored at S37. The communication terminal 30A receives the notification indicating the addition of the image type information at the transmitting/receiving unit 31. The transmitting/receiving unit 51 transmits the notification indicating the addition of the image type information to another IP address that is associated with the same session ID as that of the IP address of the communication terminal 30A in the session management DB 5001 (see FIG. 17). That is, the notification indicating the addition of the image type information is transmitted to another communication terminal 30 in the same virtual room as that of the communication terminal 30A.

Then, the storing and reading unit 39 of the communication terminal 30D stores, in the image type management DB 3002D (see FIG. 14), a new record associating the image data ID, the IP address of the transmission source terminal (i.e., the communication terminal 30A), and the image type information, which are received at S40, with one another (S41). The notification indicating the addition of the image type information is also transmitted to another communication terminal 30, namely, the communication terminal 30C, and is stored in the image type management DB 3002C of the communication terminal 30C. Accordingly, the communication terminals 30A, 30C, and 30D can share the same information in the image type management DBs 3002A, 3002C, and 3002D, respectively.

Process for Communicating Captured Image Data

Figure 24:
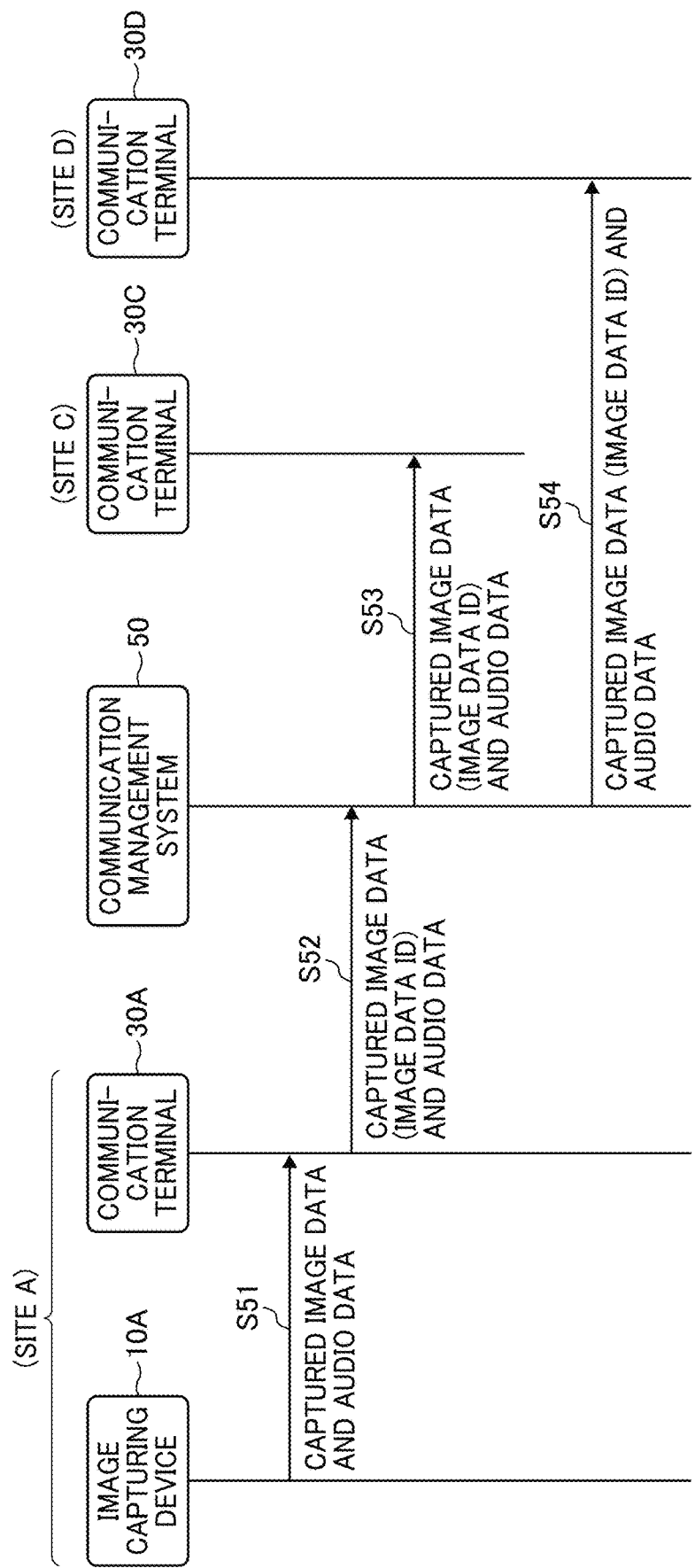
FIG. 24 is a sequence diagram illustrating operation of transmitting captured image data and audio data, performed by the image communication system, according to embodiments.

Next, operation of transmitting captured image data and audio data that are obtained at the site A to other communication terminals (i.e., the communication terminals 30C and 30D) via the communication management system 50 is described with reference to FIGS. 24 and 25. FIG. 24 is a sequence diagram illustrating operation of transmitting captured image data and audio data, performed by the image communication system 1, according to the embodiment. FIG. 24 illustrates an example in which captured image data acquired by one image capturing device 10 is distributed to the communication terminals 30. However, similar processing is performed when a plurality of captured image data acquired by other image capturing devices 10 installed in the same site are distributed.

First, the communication unit 11 of the image capturing device 10A transmits to the communication terminal 30A captured image data acquired by capturing an object or surroundings such as scenery and audio data acquired by collecting sounds (S51). In this case, since the image capturing device 10A is capable of obtaining two hemispherical images from which a spherical image is generated, as illustrated in FIGS. 3A and 3B, the captured image data includes data of two hemispherical images. The communication terminal 30A receives the captured image data and the audio data at the communication unit 38.

Then, the transmitting/receiving unit 31 of the communication terminal 30A transmits to the communication management system 50 the captured image data and the audio data sent from the image capturing device 10A (S52). Along with the captured image data and the audio data, an image data ID identifying the captured image data, which is a transmission target, is also transmitted. The communication management system 50 receives the captured image data, the audio data, and the image data ID at the transmitting/receiving unit 51.

Then, the transmitting/receiving unit 51 of the communication management system 50 transmits the captured image data and the audio data to the communication terminals (the communication terminals 30C and 30D) participating in the same session as the session in which the communication terminal 30A is participating (S53 and S54). Along with the captured image data and the audio data, an image data ID identifying the captured image data, which is a transmission target, is also transmitted. The communication terminals 30C and 30D receive the captured image data, the audio data, and the image data ID at the respective transmitting/receiving units 31.

Figure 25:
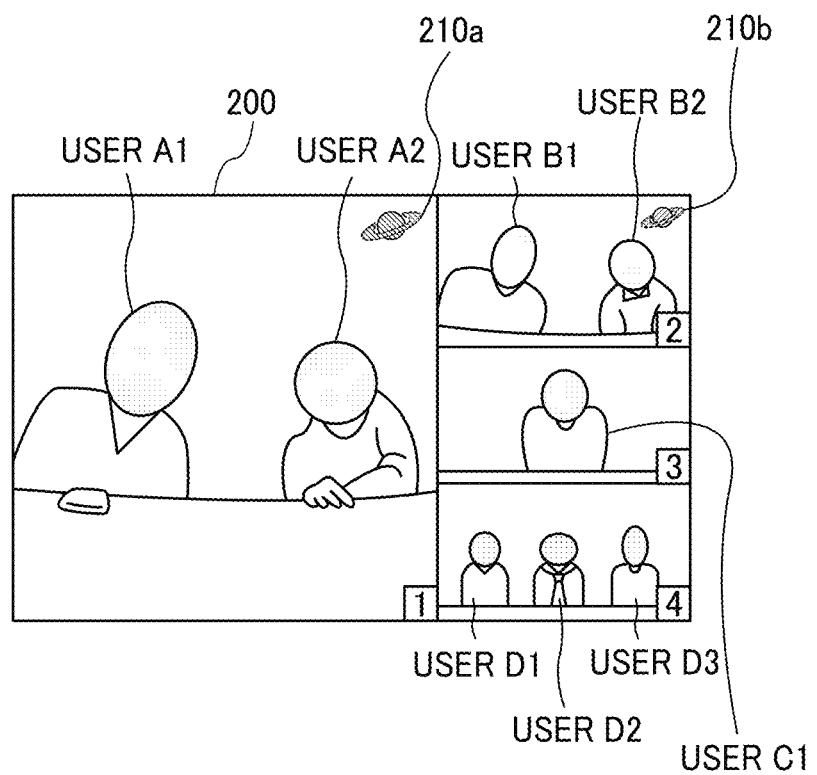
FIG. 25 is a view illustrating an example of a display screen displayed on the communication terminal according to embodiments.

Referring to FIG. 25, an example display on the communication terminal 30 at each site is described. FIG. 25 is a view illustrating an example of a display screen displayed on the communication terminal 30. A display screen 200 displays captured images of the respective sites, which are based on captured image data. For example, when an image captured at a predetermined site is a spherical image, the display screen 200 displays a spherical image and a predetermined-area image, which are generated from captured image data sent from the other sites.

When the captured image data sent from the image capturing devices 10A and 10B, which are capable of capturing spherical images, is displayed as is, the images of the sites A and B are each displayed as a hemispherical image of the front side and a hemispherical image of the rear side as respectively illustrated in FIGS. 3A and 3B. In contrast, when the generation unit 37 generates a spherical image from the captured image data output from each of the image capturing devices 10A and 10B, which are capable of obtaining two hemispherical images from which a spherical image is generated, and further generates a predetermined-area image, as illustrated in FIG. 25, a predetermined-area image that is a planar image is displayed. The images of the sites C and D are displayed as general images (in the illustrated example, planar images) because the communication terminal 30C configured to obtain a general image captures the image of the site C and the communication terminal 30D configured to obtain a general image captures the image of the site D.

The users at the respective sites are able to change a predetermined area corresponding to a predetermined-area image in the same spherical image. For example, each user at each site operates the input device, such as the pointing device 312, to allow the acceptance unit 32 to receive movement of the predetermined-area image and the display control unit 34 to shift or rotate the predetermined-area image or reduce or increase the size of the predetermined-area image.

The image of the site A is displayed in a left display area (with the layout number "1") of the display screen 200, and the image of the site B is displayed in an upper right display area (with the layout number "2") of the display screen 200. The image of the site C is displayed in a middle-right display area (with the layout number "3") of the display screen 200, and the image of the site D is displayed in a lower right display area (with the layout number "4") of the display screen 200. The display area having the layout number "1" is a main display area, and the display areas having the layout numbers "2", "3", and "4" are sub-display areas. The image in the main display area and the images in the sub display areas can be changed in each communication terminal. In general, an image in which a main person in the video communication is included is displayed in the main display area at each site.

In FIG. 25, spherical icons 210a and 210b are examples of a special image identification icon for identifying a predetermined-area image representing the predetermined area T, which is a portion of the spherical image. The spherical icons 210a and 210b may be displayed at any position such as an upper left corner, a lower left corner, or a lower right corner, instead of the upper right corner. The type of the spherical icons 210a and 210b is not limited to that illustrated in FIG. 25. Instead of the spherical icons 210a and 210b, characters such as "spherical image" may be used, or a combination of an icon and characters may be used.

Video Data Recording Process

Figure 26:
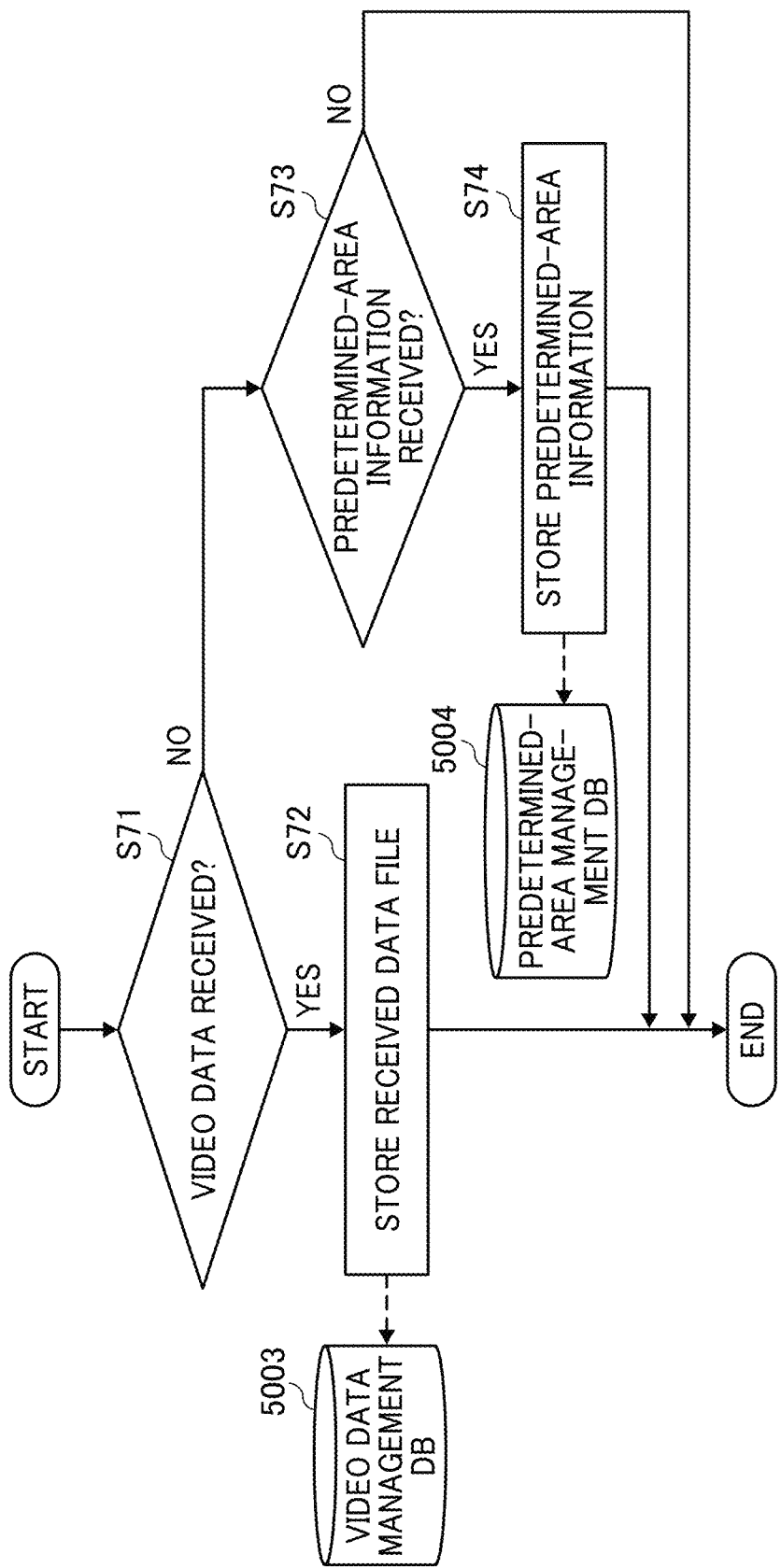
FIG. 26 is a flowchart illustrating an example of a video data recording process according to embodiments.

Next, operation of recording video data transmitted from the communication terminal 30 at each site in the communication management system 50 is described with reference to FIG. 26. FIG. 26 is a flowchart illustrating an example of a video data recording process. The video data recording process illustrated in FIG. 26 is executed when the communication management system 50 receives captured image data, as in S52 in FIG. 24.

First, the determination unit 52 of the communication management system 50 determines whether the data transmitted from the communication terminal 30 (e.g., the communication terminal 30A illustrated in FIG. 24) from which the captured image data and the like are transmitted is video data. When the determination unit 52 determines that video data is received by the transmitting/receiving unit 51 (YES at S71), the process proceeds to S72.

Then, the video recording processing unit 53 stores the data file of the video data received by the transmitting/receiving unit 51 in the video data management DB 5003 (see FIG. 19) (S72). In this case, the video recording processing unit 53 stores the IP address of the transmission source of the received video data and a recorded data file (e.g., a file name) of the received video data in the video data management DB 5003 in association with each other. For example, the video recording processing unit 53 combines captured image data and audio data transmitted from the communication terminal 30 at each site to obtain a single recorded data file for each site, and stores the recorded data files for the respective sites in the video data management DB 5003.

When the determination unit 52 determines that the data received by the transmitting/receiving unit 51 is not video data (NO at S71), the process proceeds to S73.

Then, the determination unit 52 determines whether predetermined-area information has been received from the communication terminal 30 (e.g., the communication terminal 30C or the communication terminal 30D illustrated in FIG. 24) used to view captured image data distributed from another site. In live distribution of video data, the communication terminal 30 transmits predetermined-area information to the communication management system 50 to constantly notify the communication management system 50 of which spherical image is being viewed at the site where the communication terminal 30 is installed, when the communication terminal 30 is to display a spherical image in a display direction synchronized with that of another communication terminal 30. When the determination unit 52 determines that predetermined-area information has been received by the transmitting/receiving unit 51 from the communication terminal 30 (YES at S73), the process proceeds to S74. Then, the storing and reading unit 59 stores the predetermined-area information received by the transmitting/receiving unit 51 in the predetermined-area management DB 5004 (see FIG. 20) (S74). In this case, the storing and reading unit 59 stores the received predetermined-area information in the predetermined-area management DB 5004 in association with the IP addresses of the transmission source and the transmission destination of the video data corresponding to the received predetermined-area information and a time stamp indicating the reproduction time of the video data corresponding to the received predetermined-area information.

When the determination unit 52 determines at S73 that predetermined-area information has not been received by the transmitting/receiving unit 51 (NO at S73), the process ends. In live distribution of video data, when the communication terminal 30 is to display a spherical image in a display direction that is not synchronized with that of another communication terminal 30, the communication terminal 30 does not transmit predetermined-area information, or performs control not to cause the communication management system 50 to store predetermined-area information.

Distribution Condition Setting Process

Figure 27:
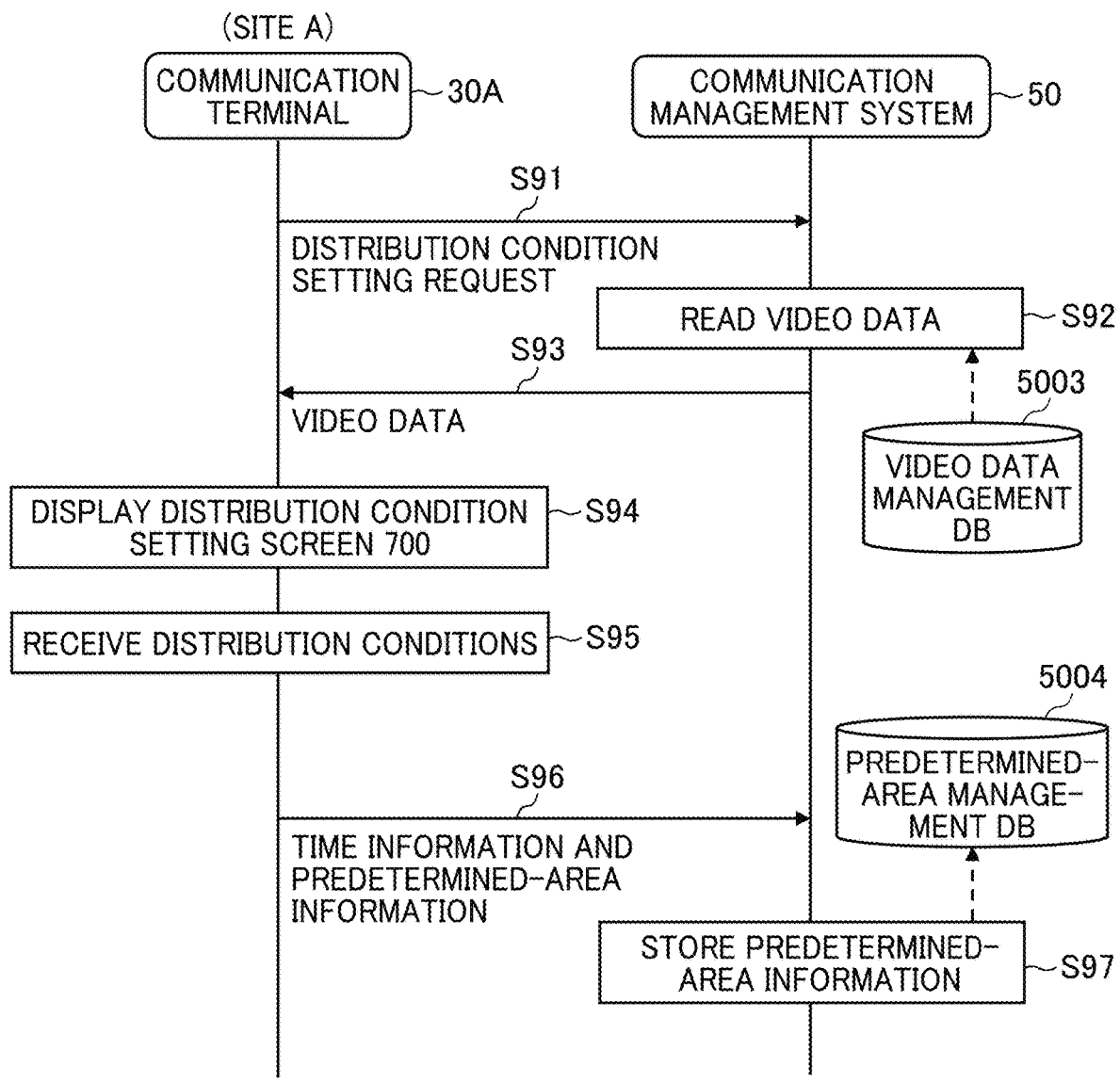
FIG. 27 is a sequence diagram illustrating an example of a distribution condition setting process according to embodiments.

Next, operation of setting distribution conditions of recorded video data is described with reference to FIGS. 27 and 28. FIG. 27 is a sequence diagram illustrating an example of a distribution condition setting process. Referring to FIG. 27, a description will be given of a case where the user A1 at the site A uses the communication terminal 30A to set distribution conditions of video data including a spherical image captured by the image capturing device 10A.

First, the transmitting/receiving unit 31 of the communication terminal 30A transmits a distribution condition setting request to the communication management system 50 in response to a predetermined input operation performed by the user A1 (S91). The communication management system 50 receives the distribution condition setting request transmitted from the communication terminal 30A at the transmitting/receiving unit 51.

Then, the storing and reading unit 59 of the communication management system 50 searches the video data management DB 5003 (see FIG. 19) using as a search key the IP address of the communication terminal 30A from which the distribution condition setting request received at S91 is transmitted, to read the data file of the video data associated with the IP address of the communication terminal 30A (S92). Then, the transmitting/receiving unit 51 transmits the video data read at S92 to the communication terminal 30A from which the distribution condition setting request is transmitted (S93). The communication terminal 30A receives the video data transmitted from the communication management system 50 at the transmitting/receiving unit 31.

Then, the display control unit 34 of the communication terminal 30A causes the display 306 to display a distribution condition setting screen 700 (S94). FIG. 28 is a view illustrating an example of the distribution condition setting screen 700. The distribution condition setting screen 700 illustrated in FIG. 28 is a screen for setting a predetermined area to be displayed on the communication terminal 30 when video data is distributed to each site during reproduction of recorded video data. The distribution condition setting screen 700 includes an image display area 710, a reproduction position display area 730, a predetermined-area information display area 740, a setting button 750, and a "finish"

button 755. The image display area 710 displays an image based on video data being reproduced. The reproduction position display area 730 displays a reproduction position of the video data. The predetermined-area information display area 740 indicates a predetermined area corresponding to a display direction specified in the image display area 710. The setting button 750 is pressed to set distribution conditions. The "finish" button 755 is pressed to finish the setting of distribution conditions.

The image display area 710 includes display direction change buttons 720 (720a, 720b, 720c, and 720d) for changing the display direction for the video data. For example, the user A1 selects a desired one of the display direction change buttons 720 to change the display direction of the image to be displayed in the image display area 710. The reproduction position display area 730 includes a play button 731, a pause button 732, and a slider 735. The play button 731 is pressed to reproduce the video data. The pause button 732 is pressed to stop the reproduction of the video data. The slider 735 indicates a reproduction history (reproduction position) relative to the entire reproduction time. The slider 735 forms a seek bar. The seek bar is an operation area for designating a reproduction position of the video data. The seek bar displays the reproduction position of the video data. The slider 735 allows the user A1 to visually grasp, for example, which portion of the video data is being reproduced from the beginning to the end of the video data. Further, for example, the user A1 can move the slider 735 using the input device, such as the pointing device 312, to reproduce the video data from a desired reproduction position.

The predetermined-area information display area 740 presents predetermined-area information corresponding to the predetermined-area image displayed in the image display area 710. In the predetermined-area information display area 740, values of the predetermined area corresponding to the predetermined-area image being displayed are changed as appropriate by changing the display direction of the image to be displayed in the image display area 710 in response to, for example, the user A1 selecting and moving any one of the display direction change buttons 720. The user A1 may manually input the values of the predetermined area to be displayed in the predetermined-area information display area 740 to change the display direction of the image to be displayed in the image display area 710.

The acceptance unit 32 of the communication terminal 30A receives input of distribution conditions in response to the user A1 selecting any one of the display direction change buttons 720 or inputting numerical values in the predetermined-area information display area 740 and pressing the setting button 750 (S95). In this case, the acceptance unit 32 receives predetermined-area information selected or input by the user A1 as distribution conditions. Then, the transmitting/receiving unit 31 of the communication terminal 30A transmits to the communication management system 50 the predetermined-area information input at S95 and time information indicating the reproduction time of the video data corresponding to the input predetermined-area information (S96). The communication management system 50 receives the predetermined-area information and the time information, which are transmitted from the communication terminal 30A, at the transmitting/receiving unit 51.

Then, the distribution condition setting unit 55 of the communication management system 50 stores the time stamp corresponding to the predetermined-area information and the time information received at S96 in the predetermined-area management DB 5004 (see FIG. 20) in association with the IP address of the communication terminal 30A from which the distribution condition setting request received at S91 is transmitted (S97). In this case, for example, the distribution condition setting unit 55 sets the IP address of the image transmission destination, which is to be stored in association with the received predetermined-area information, to "all". When the predetermined-area information to be stored matches predetermined-area information corresponding to a set of a transmission source of the captured image data and a time stamp of the video data that has already been managed in the predetermined-area management DB 5004, the distribution condition setting unit 55 rewrites the managed predetermined-area information to the received new predetermined-area information.

When an IP address of a specific image transmission destination corresponding to predetermined-area information to be stored in the predetermined-area management DB 5004 has already existed, the distribution condition setting unit 55 may use the IP address of the specific image transmission destination that has already existed, as is, without setting the IP address of the image transmission source to "all". Alternatively, for example, the distribution condition setting unit 55 may be configured to prompt the user A1 to input the IP address of the image transmission destination using the distribution condition setting screen 700 illustrated in FIG. 28 to store the IP address of the specific image transmission destination in association with the received predetermined-area information.

Recorded Data Distribution Process

Next, operation of distributing video data recorded in the communication management system 50 is described with reference to FIGS. 29 to 33. FIG. 29 is a sequence diagram illustrating an example of a recorded video data distribution process. The example illustrated in FIG. 29 presents a description of operation of distributing video data recorded by the communication management system 50 to the communication terminal 30C at the site C.

First, the transmitting/receiving unit 31 of the communication terminal 30C transmits a video distribution request to the communication management system 50 in response to a predetermined input operation performed by the user C1 (S111). The video distribution request includes information for identifying the video data for which distribution is requested (e.g., the IP address of the transmission source of the video data or the file name of the video data). The communication management system 50 receives the video distribution request transmitted from the communication terminal 30C at the transmitting/receiving unit 51.

Then, the storing and reading unit 59 of the communication management system 50 reads, from the predetermined-area management DB 5004 (see FIG. 20), predetermined-area information corresponding to the video data specified by the video distribution request received at S111 (S112). In this case, the storing and reading unit 59 reads the intended predetermined-area information and the time stamp associated with the predetermined-area information. Then, the transmitting/receiving unit 51 transmits, to the communication terminal 30C from which the request is transmitted, a set of the predetermined-area information read at S112 and time information indicating a reproduction time identified by the time stamp associated with the predetermined-area information (S113). The communication terminal 30C receives the set of the predetermined-area information and the time information, which is transmitted from the communication management system 50, at the transmitting/receiving unit 31. The communication management system 50 may perform the processing of S112 and S113 at once on all of the target pieces of predetermined-area information stored in the predetermined-area management DB 5004, or may sequentially perform the processing of S112 and S113 every certain period (e.g., 30 seconds) in accordance with the reproduction time of the video data.

Then, the storing and reading unit 39 of the communication terminal 30C stores the predetermined-area information received at S113 and the time stamp corresponding to the time information received at S113 in the predetermined-area management DB 3003 (hereinafter also referred to as the "predetermined-area management DB 3003C" when distinguished from those of the other communication terminals 30) (see FIG. 16) in association with each other (S114).

Then, the storing and reading unit 59 of the communication management system 50 reads, from the video data management DB 5003 (see FIG. 19), the recorded data file of the video data specified by the video distribution request received at S11 (S115). Then, the transmitting/receiving unit 51 sequentially transmits the captured image data and the audio data of the video data, based on the recorded data file read at S115, to the communication terminal 30C from which the request is transmitted (S116). Along with the captured image data and the audio data, an image data ID identifying the captured image data, which is a transmission target, is also transmitted. The communication terminal 30C receives the captured image data and the audio data transmitted from the communication management system 50 at the transmitting/receiving unit 31.

Then, the display control unit 34 of the communication terminal 30C reproduces the video data received at S116 to display the captured image (S117). When a plurality of recorded data files have been simultaneously recorded in the same session, the communication management system 50 may simultaneously distribute the recorded data files to the communication terminal 30C, and the communication terminal 30C may display the recorded data files in combination when viewing them. In response to the video distribution request at S111, the communication management system 50 may distribute data to each individual communication terminal 30 or synchronously distribute data to a plurality of communication terminals 30.

An example of the display of an image based on recorded video data on the communication terminal 30C is described with reference to FIGS. 30 to 33. First, referring to FIGS. 30 and 31, reproduction of video data in a case where a synchronized display direction is provided for the video data is described. FIG. 30 is a flowchart illustrating an example process for reproducing video data on the communication terminal 30C.

First, as illustrated at S113 in FIG. 29, when the predetermined-area information transmitted from the communication management system 50 has been received by the communication terminal 30C (YES at S131), the process proceeds to S132. When the predetermined-area information has not been received by the communication terminal 30C (NO at S131), the process ends.

Then, as illustrated at S114 in FIG. 29, the storing and reading unit 39 of the communication terminal 30C stores the predetermined-area information received at S131 in the predetermined-area management DB 3003C in association with a time stamp indicating a reproduction time of the video data corresponding to the predetermined-area information (S132).

The following processing is performed in reproducing video data.

The determination unit 35 of the communication terminal 30C refers to the predetermined-area management DB 3003C in which the predetermined-area information is stored at S132, and determines whether the predetermined-area information corresponding to the time stamp of the video data transmitted from the communication management system 50 is stored in the predetermined-area management DB 3003C. When the predetermined-area information corresponding to the time stamp of the video data transmitted from the communication management system 50 is present in the predetermined-area management DB 3003C (YES at S133), the process proceeds to S134. By contrast, when the predetermined-area information corresponding to the time stamp of the video data transmitted from the communication management system 50 is not present in the predetermined-area management DB 3003C (NO at S133), the process ends without providing a synchronized display direction for the video data.

Then, to display an image of a predetermined area identified by the predetermined-area information stored at S132 in a synchronized display direction for the video data, the generation unit 37 of the communication terminal 30C applies perspective projection conversion using the predetermined-area information received at S131 to generate a predetermined-area image (S134). As a result, the communication terminal 30C can generate the predetermined-area image corresponding to the distribution conditions set by the communication management system 50.

Then, the display control unit 34 causes the display 306 to display the predetermined-area image generated at S134 (S135).

FIG. 31 is a view illustrating an example of a display screen displayed on the communication terminal 30C when a synchronized display direction is provided. The example illustrated in FIG. 31 presents a display screen 400 on which an image based on video data corresponding to a synchronized display direction is displayed in a predetermined reproduction time. The display screen 400 includes a predetermined-area image 410, a synchronization completion icon 415, and a reproduction position display area 430. The predetermined-area image 410 is generated from the video data at S134. The synchronization completion icon 415 indicates that a synchronized display direction is provided. The reproduction position display area 430 displays a reproduction position of the video data. The reproduction position display area 430 includes a play button 431, a pause button 432, and a slider 435. The play button 431 is pressed to reproduce the video data. The pause button 432 is pressed to stop the reproduction of the video data. The slider 435 indicates a reproduction history (reproduction position) relative to the entire reproduction time. The play button 431, the pause button 432, and the slider 435 have configurations similar to those of the play button 731, the pause button 732, and the slider 735 illustrated in FIG. 28.

As described above, the communication management system 50 causes the communication terminal 30C to display a predetermined-area image corresponding to distribution conditions set by the communication management system 50, and enables the communication terminal 30C to display an image based on video data corresponding to a synchronized display direction. In this case, the user C1 is not allowed to change the display direction while viewing the predetermined-area image 410 displayed on the display screen 400. The synchronization completion icon 415 displayed on the display screen 400 allows the user C1 to grasp that the display direction for the video data is not changeable. The predetermined-area information transmitted from the communication management system 50 to the communication terminal 30C may be information transmitted from the communication terminal 30 for viewing at the time of live distribution of the video data and stored in the communication management system 50, as illustrated at S74 in FIG. 26, or may be information stored in the communication management system 50 in accordance with the distribution condition setting process, as illustrated at S97 in FIG. 27.

Next, referring to FIGS. 32 and 33, reproduction of video data in a case where a synchronized display direction is not provided is described. FIG. 32 is a flowchart illustrating an example process for changing a display direction on the communication terminal 30C.

First, when a synchronized display direction is provided for the video data transmitted from the communication management system 50 (YES at S151), the communication terminal 30C ends the process. In this case, as illustrated at S134 and S135 in FIG. 30, the communication terminal 30C displays the predetermined-area image corresponding to the synchronized display direction. When no synchronized display direction is provided for the video data (NO at S151), the communication terminal 30C causes the process to proceed to S152.

Then, the communication terminal 30C determines whether a change of the display direction for the video data has been received (S152). FIG. 33 is a view illustrating an example of a display screen displayed on the communication terminal 30C when no synchronized display direction is provided. The display screen 400 illustrated in FIG. 33 includes a predetermined-area image 410, which is an image of any predetermined area of the video data received at S116 in FIG. 29, display direction change buttons 420 (420a, 420b, 420c, and 420d) for changing the display direction for the video data, and a reproduction position display area 430 that displays a reproduction position of the video data. For example, the user C1 selects a desired one of the display direction change buttons 420 to change the display direction for the video data corresponding to the predetermined-area image 410 to be displayed. The reproduction position display area 430 has a configuration similar to that illustrated in FIG. 31.

When the acceptance unit 32 of the communication terminal 30C receives a change of the display direction in response to the user C1 selecting any one of the display direction change buttons 420 (YES at S152), the process proceeds to S153. When the acceptance unit 32 of the communication terminal 30C has not received a change of the display direction (NO at S152), the process ends.

Then, the storing and reading unit 39 of the communication terminal 30C stores predetermined-area information indicating a predetermined area corresponding to the display direction received at S152 in the predetermined-area management DB 3003C in association with a time stamp indicating the reproduction time of the video data corresponding to the predetermined-area information (S153).

Then, to display an image of a predetermined area identified by the predetermined-area information stored at S153, the generation unit 37 of the communication terminal 30C applies perspective projection conversion using the predetermined-area information stored at S153 to generate a predetermined-area image (S154). Then, the display control unit 34 causes the display 306 to display the predetermined-area image generated at S154 (S155).

As described above, when no synchronized display direction is provided for video data by the communication management system 50, the communication terminal 30C may display a predetermined-area image corresponding to a desired display direction in response to an input operation of the user C1.

As described above, in the distribution of recorded video data including a spherical image, the image communication system 1 reflects a synchronized display direction for the recorded video data such that a viewer is allowed to operate a display direction for the video data as desired in a certain time period, whereas an image corresponding to the synchronized display direction is viewed in some other time period. Accordingly, the image communication system 1 can cause the communication terminal 30 to display an image corresponding to an appropriate display direction in accordance with the reproduction time of video data captured at a different site.

In the image communication system 1, furthermore, the communication management system 50 sets, for a recorded data file of video data transmitted from the image capturing device 10 or the communication terminal 30 at each site, predetermined-area information corresponding to a reproduction time of the video data for video recording and distribution to allow the communication terminal 30 to display an image based on the recorded video data in a synchronized display direction.

In the above-described embodiments, the predetermined area T is specified by predetermined-area information indicating an imaging direction and an angle of view of the virtual camera IC in a three-dimensional virtual space containing the spherical image CE, but the present disclosure is not limited thereto. The predetermined area T may be specified by predetermined point information indicating the center point CP or an arbitrary point of four corners of the predetermined area T having a rectangular shape in FIG. 7. In such a case, it is assumed that an angle of view is constant. In the above-described embodiments, a captured image (whole image) is a three-dimensional spherical panoramic image, as an example of a spherical image. In another example, the captured image is a two-dimensional panoramic image, as an example of a spherical image.

Each of the functions of the described embodiments may be implemented by one or more processing circuits or circuitry. Processing circuitry includes a programmed processor, such as a processor including circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

Each of the tables of the above-described embodiment may be generated by learning effect of machine learning. In addition, in alternative to using the tables, the data of each related item may be classified by the machine learning. In the present disclosure, the machine learning is defined as a technology that makes a computer acquire human-like learning ability. In addition, the machine learning refers to a technology in which a computer autonomously generates an algorithm required for determination such as data identification from learning data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

The invention claimed is:

1. A communication terminal, comprising:
   circuitry configured to:
   receive, from another communication terminal, predetermined area information and video data including a captured image, the predetermined area information corresponding to a reproduction time of the video data and indicating a predetermined area of the captured image, the receiving being performed in response to at least one of inputting or selecting the predetermined area information by a first user, the predetermined area information having been selected at the another communication terminal; and
   reproduce the video data to a second user at a different location than the first user, while synchronizing a display direction of the video data based on the predetermined area information corresponding to the reproduction time,
   wherein a display direction of the image of the video data cannot be changed by a user while the user is viewing the predetermined area.

2. The communication terminal of claim 1, wherein:
   the video data is recorded image data distributed by the another communication terminal, and
   the circuitry is further configured to reproduce the recorded image data while synchronizing the display direction of the recorded image data, when the recorded image data is being reproduced.

3. The communication terminal of claim 1, wherein the captured image is a full-spherical image.

4. An image communication system comprising:
   a first communication terminal; and
   a second communication terminal,
   the first communication terminal including first circuitry configured to transmit, to the second communication terminal, predetermined area information and video data including a captured image, the predetermined area information corresponding to a reproduction time of the video data and indicating a predetermined area of the captured image, the transmitting being performed in response to at least one of inputting or selecting the predetermined area information by a first user, the predetermined area information having been selected at the first communication terminal,
   the second communication terminal including second circuitry configured to reproduce the video data to a second user at a different location than the first user, while synchronizing a display direction of the video data based on the predetermined area information corresponding to the reproduction time that is received from the first communication terminal,
   wherein a display direction of the image of the video data cannot be changed by a user while the user is viewing the predetermined area.

5. A method, comprising:
   receiving, from another communication terminal, predetermined area information and video data including a captured image, the predetermined area information corresponding to a reproduction time of the video data and indicating a predetermined area of the captured image, the receiving being performed in response to at least one of inputting or selecting the predetermined area information by a first user, the predetermined area information having been selected at the another communication terminal; and
   reproducing the video data to a second user at a different location than the first user, while synchronizing a display direction of the video data based on the predetermined area information corresponding to the reproduction time,
   wherein a display direction of the image of the video data cannot be changed by a user while the user is viewing the predetermined area.

6. The method of claim 5, wherein:
   the video data is recorded image data distributed by the another communication terminal, and
   the method further comprises reproducing the recorded image data while synchronizing the display direction of the recorded image data, when the recorded image data is being reproduced.

7. The method of claim 5, wherein the captured image is a full-spherical image.

8. A non-transitory computer readable medium storing computer instructions which when executed by one or more processors cause the following method to be performed:
   receiving, from another communication terminal, predetermined area information and video data including a captured image, the predetermined area information corresponding to a reproduction time of the video data and indicating a predetermined area of the captured image, the receiving being performed in response to at least one of inputting or selecting the predetermined area information by a first user, the predetermined area information having been selected at the another communication terminal; and
   reproducing the video data to a second user at a different location than the first user, while synchronizing a display direction of the video data based on the predetermined area information corresponding to the reproduction time,
   wherein a display direction of the image of the video data cannot be changed by a user while the user is viewing the predetermined area.

9. The non-transitory computer readable medium of claim 8, wherein:
   the video data is recorded image data distributed by the another communication terminal, and
   the method further comprises reproducing the recorded image data while synchronizing the display direction of the recorded image data, when the recorded image data is being reproduced.

10. The non-transitory computer readable medium of claim 8, wherein the captured image is a full-spherical image.

11. A method, comprising:
providing a communication terminal with a function to receive, from another communication terminal, predetermined-area information and video data including a captured image, the predetermined-area information corresponding to a reproduction time of the video data and indicating a predetermined area of the captured image the receiving being performed in response to at least one of inputting or selecting the predetermined-area information by a first user, the predetermined-area information having been selected at the another communication terminal; and
providing the communication terminal with a function of reproducing the video data to a second user at a different location than the first user, while synchronizing a display direction of the video data based on the predetermined-area information corresponding to the reproduction time,
wherein a display direction of the image of the video data cannot be changed by a user while the user is viewing the predetermined area.

12. The communication terminal according to claim 1, further comprising:
a plurality of communication terminals including the communication terminal,
wherein there is set a predetermined area that is different for each of the plurality of communication terminals, and transmits the predetermined-area that are different and the video data to the plurality of communication terminals.

13. The image communication system according to claim 4, further comprising:
a plurality of communication terminals including the second communication terminal,
wherein there is set a predetermined area that is different for each of the plurality of communication terminals, and transmits the predetermined-area that are different and the video data to the plurality of communication terminals.

14. The method according to claim 5, wherein:
a plurality of communication terminals include the communication terminal, and
there is set a predetermined area that is different for each of the plurality of communication terminals, and there is transmitted the predetermined-area that is different and the video data to the plurality of communication terminals.

15. The non-transitory computer readable medium according to claim 8, wherein:
a plurality of communication terminals include the communication terminal, and
there is set a predetermined area that is different for each of the plurality of communication terminals, and there is transmitted the predetermined-area that is different and the video data to the plurality of communication terminals.

* * * * *